United States Patent
McAndrews et al.

(10) Patent No.: US 10,647,373 B2
(45) Date of Patent: May 12, 2020

(54) ADJUSTABLE ASSEMBLY FOR BICYCLES AND METHODS OF USING SAME

(71) Applicant: SPECIALIZED BICYCLE COMPONENTS, INC., Morgan Hill, CA (US)

(72) Inventors: Michael McAndrews, Capitola, CA (US); Ron Powers, Santa Cruz, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 16/105,785

(22) Filed: Aug. 20, 2018

(65) Prior Publication Data
US 2019/0077477 A1    Mar. 14, 2019

Related U.S. Application Data

(63) Continuation of application No. 15/379,176, filed on Dec. 14, 2016, now Pat. No. 10,053,172, which is a (Continued)

(51) Int. Cl.
*B62J 1/08* (2006.01)
*B62K 25/08* (2006.01)
(Continued)

(52) U.S. Cl.
CPC ............... *B62J 1/08* (2013.01); *B62K 19/00* (2013.01); *B62K 19/18* (2013.01); *B62K 19/36* (2013.01);
(Continued)

(58) Field of Classification Search
CPC ..... Y10T 403/32516; Y10T 403/32467; Y10T 403/32501; F16B 7/1427; F16B 7/1463;
(Continued)

(56) References Cited

U.S. PATENT DOCUMENTS 373,303 A    11/1887   Patzer
390,381 A    10/1888   Luetke
(Continued)

FOREIGN PATENT DOCUMENTS

DE    9013266    11/1990
DE    9405449     9/1994
(Continued)

OTHER PUBLICATIONS

International Search Report (dated Oct. 22, 2009) for International Application No. PCT/US2009/044199, which is the PCT counterpart of the present application.

*Primary Examiner* — Daniel J Wiley
(74) *Attorney, Agent, or Firm* — Knobbe Martens Olson & Bear LLP

(57) ABSTRACT

An adjustable assembly for a bicycle includes a first support having an interior surface and a second support slidably positioned within at least a portion of the first support. One of the first support and the second support is adapted to attach to a first bicycle portion, and the other of the first support and the second support is adapted to attach to a second bicycle portion. Further, the second support comprises an expansion portion configured to be moved between an expanded position and a retracted position. The expansion portion is configured to engage the interior surface of the first support when the expansion portion is in an expanded position. In addition, the first support is configured to be selectively moved relative to the second support when the expansion portion is permitted to assume a retracted position.

20 Claims, 17 Drawing Sheets

Related U.S. Application Data continuation of application No. 14/251,405, filed on Apr. 11, 2014, now Pat. No. 9,550,543, which is a continuation of application No. 13/706,167, filed on Dec. 5, 2012, now Pat. No. 8,702,336, which is a continuation of application No. 12/463,352, filed on May 8, 2009, now Pat. No. 8,328,454.

(60) Provisional application No. 61/077,112, filed on Jun. 30, 2008, provisional application No. 61/099,518, filed on Sep. 23, 2008.

(51) Int. Cl.
*B62K 19/18* (2006.01)
*B62K 19/36* (2006.01)
*B62K 19/00* (2006.01)
*B62K 25/04* (2006.01)

(52) U.S. Cl.
CPC ........ *B62K 25/08* (2013.01); *B62K 2025/045* (2013.01); *B62K 2025/048* (2013.01); *Y10T 403/32467* (2015.01); *Y10T 403/32516* (2015.01); *Y10T 403/76* (2015.01)

(58) Field of Classification Search
CPC .. B62K 21/24; B62K 19/36; B62J 1/00; B62J 1/06; B62J 1/08; A47C 3/20; A47C 3/285
See application file for complete search history.

(56) References Cited

U.S. PATENT DOCUMENTS

| | | | |
|---|---|---|---|
| 390,406 A | 10/1888 | Sittig | |
| 510,993 A | 12/1893 | Riess | |
| 617,831 A | 1/1899 | Irish et al. | |
| 2,644,504 A | 7/1953 | Vick | |
| 2,780,277 A | 2/1957 | Ries et al. | |
| 2,909,212 A | 10/1959 | Scherer | |
| 3,228,647 A | 1/1966 | Musianowycz | |
| 3,327,985 A | 6/1967 | Levit et al. | |
| 3,560,032 A | 2/1971 | Cohen et al. | |
| 3,861,740 A | 1/1975 | Tajima et al. | |
| 4,023,649 A | 5/1977 | Wood | |
| 4,113,221 A | 9/1978 | Wehner | |
| 4,113,222 A | 9/1978 | Frinzel | |
| 4,150,851 A | 4/1979 | Cienfuegos | |
| 4,165,854 A | 8/1979 | Duly | |
| 4,245,826 A | 1/1981 | Wirges | |
| 4,261,540 A | 4/1981 | Baker et al. | |
| 4,640,484 A | 2/1987 | Lamond | |
| 4,674,796 A | 6/1987 | Weinich et al. | |
| 4,706,916 A | 11/1987 | Cullmann et al. | |
| 4,772,069 A | 9/1988 | Szymski | |
| 4,789,176 A | 12/1988 | Carroll | |
| 4,807,856 A | 2/1989 | Teckenbrock | |
| 4,850,733 A | 7/1989 | Shook | |
| 4,850,743 A | 7/1989 | Hopper | |
| 4,872,696 A | 10/1989 | Gill | |
| 4,919,378 A | 4/1990 | Iwasaki et al. | |
| 5,036,873 A | 8/1991 | Clayton | |
| 5,044,592 A | 9/1991 | Cienfuegos | |
| 5,149,034 A | 9/1992 | Ganaja | |
| 5,236,169 A | 8/1993 | Johnsen | |
| 5,240,219 A | 8/1993 | Stonehouse | |
| 5,398,954 A | 3/1995 | Chonan | |
| 5,458,020 A | 10/1995 | Wang | |
| 5,459,908 A | 10/1995 | Chen | |
| 5,500,981 A | 3/1996 | Ho | |
| 5,513,895 A | 5/1996 | Olson et al. | |
| 5,584,097 A | 12/1996 | Lu | |
| 5,586,830 A | 12/1996 | Wanek et al. | |
| 5,620,070 A | 4/1997 | Wang | |
| 5,628,088 A | 5/1997 | Chen | |
| 5,683,200 A | 11/1997 | Levy | |
| 5,713,555 A | 2/1998 | Zurfluh et al. | |
| 5,727,898 A | 3/1998 | Lu | |
| 5,729,866 A | 3/1998 | Chg | |
| 5,826,935 A | 10/1998 | DeFreitas | |
| 5,829,733 A | 11/1998 | Becker | |
| 5,899,479 A | 5/1999 | Schroder | |
| 5,911,263 A | 6/1999 | Wu | |
| 6,202,971 B1 | 3/2001 | Duncan | |
| 6,220,581 B1 | 4/2001 | Mueller | |
| 6,276,756 B1 | 8/2001 | Cho et al. | |
| 6,354,557 B1 | 3/2002 | Walsh | |
| 6,478,278 B1 | 11/2002 | Duncan | |
| 6,543,754 B2 | 4/2003 | Ogura | |
| 6,585,215 B2 | 7/2003 | Duncan | |
| 6,609,686 B2 | 8/2003 | Malizia | |
| 6,827,397 B1 | 12/2004 | Driver | |
| 6,913,560 B2 | 7/2005 | Ryan et al. | |
| 7,017,928 B2 | 3/2006 | Felsl et al. | |
| 7,025,367 B2 | 4/2006 | McKinnon | |
| 7,025,522 B2 | 4/2006 | Sicz et al. | |
| 7,044,274 B2 | 5/2006 | Chen | |
| 7,083,180 B2 | 8/2006 | Turner | |
| 7,267,635 B2 | 9/2007 | Ryan et al. | |
| 7,306,206 B2 | 12/2007 | Turner | |
| 7,370,877 B2 | 5/2008 | Refsum | |
| 7,374,140 B2 | 5/2008 | Crain et al. | |
| 7,422,224 B2 | 9/2008 | Sicz et al. | |
| 7,497,454 B2 | 3/2009 | Liao | |
| 7,673,936 B2 | 3/2010 | Hsu | |
| 7,708,251 B2 | 5/2010 | Watt et al. | |
| 7,810,826 B2 | 10/2010 | McAndrews | |
| 7,845,602 B1 | 12/2010 | Young et al. | |
| 8,317,261 B2 | 11/2012 | Walsh | |
| 8,328,454 B2 | 12/2012 | McAndrews et al. | |
| 8,702,336 B2 | 4/2014 | McAndrews et al. | |
| 8,814,109 B2 | 8/2014 | Laird et al. | |
| 8,926,216 B2 | 1/2015 | McAndrews et al. | |
| 9,550,543 B2 | 1/2017 | McAndrews et al. | |
| 2001/0015400 A1 | 8/2001 | Langham | |
| 2002/0185581 A1 | 12/2002 | Trask | |
| 2003/0136885 A1 | 7/2003 | Malizia | |
| 2004/0036327 A1 | 2/2004 | Barandiaran Salaberria | |
| 2004/0208687 A1 | 10/2004 | Sicz | |
| 2006/0066074 A1 | 3/2006 | Turner | |
| 2006/0175792 A1 | 8/2006 | Sicz et al. | |
| 2007/0215781 A1 | 9/2007 | Watt | |
| 2008/0127770 A1 | 6/2008 | Morelli | |
| 2009/0192673 A1 | 7/2009 | Song et al. | |
| 2009/0324327 A1 | 12/2009 | McAndrews | |
| 2010/0160014 A1 | 6/2010 | Galasso et al. | |
| 2010/0207351 A1 | 8/2010 | Klieber | |
| 2010/0252972 A1 | 10/2010 | Cox et al. | |
| 2010/0254751 A1 | 10/2010 | McMillan, III | |
| 2010/0276906 A1 | 11/2010 | Galasso et al. | |
| 2010/0314917 A1 | 12/2010 | Hsieh | |
| 2010/0327542 A1 | 12/2010 | Hara et al. | |
| 2011/0049945 A1 | 3/2011 | Mouri | |
| 2011/0202236 A1 | 8/2011 | Galasso et al. | |
| 2012/0006949 A1 | 1/2012 | Laird et al. | |
| 2012/0080279 A1 | 4/2012 | Galasso et al. | |
| 2012/0136537 A1 | 5/2012 | Galasso et al. | |
| 2012/0228906 A1 | 9/2012 | McAndrews et al. | |
| 2013/0093159 A1 | 4/2013 | McAndrews et al. | |
| 2013/0221713 A1 | 8/2013 | Pelot et al. | |
| 2014/0318301 A1 | 10/2014 | Laird et al. | |

FOREIGN PATENT DOCUMENTS

| | | |
|---|---|---|
| DE | 4401980 | 7/1995 |
| DE | 102008059894 B4 | 11/2010 |
| DE | 202010012738 U1 | 12/2010 |
| EP | 0148979 | 7/1985 |
| EP | 1092621 | 4/2001 |
| EP | 2402239 | 1/2012 |
| FR | 1178244 | 5/1959 |
| FR | 2952031 | 5/2011 |
| GB | 2116128 | 9/1983 |
| JP | 04362482 | 12/1992 |
| TW | M278624 | 3/1994 |

(56) References Cited

FOREIGN PATENT DOCUMENTS

| | | |
|---|---|---|
| TW | 200942443 | 10/2009 |
| TW | 201104100 | 2/2011 |
| WO | WO 97/20725 | 6/1997 |
| WO | WO 2004/023937 | 3/2004 |
| WO | WO 2009/083206 | 7/2009 |
| WO | WO 2010/063535 | 6/2010 |

ADJUSTABLE ASSEMBLY FOR BICYCLES AND METHODS OF USING SAME

CROSS REFERENCE TO RELATED APPLICATIONS

This application is a continuation of U.S. patent application Ser. No. 15/379,176, filed Dec. 14, 2016, which is a continuation application of U.S. patent application Ser. No. 14/251,405, filed Apr. 11, 2014, which is a continuation of U.S. patent application Ser. No. 13/706,167, filed Dec. 5, 2012, which is a continuation of U.S. patent application Ser. No. 12/463,352, filed May 8, 2009, which claims the priority benefit under 35 U.S.C. § 119(e) of U.S. Provisional Application No. 61/077,112, filed Jun. 30, 2008, and U.S. Provisional Application No. 61/099,518, filed Sep. 23, 2008. Each of the foregoing applications is hereby incorporated by reference herein in its entirety.

BACKGROUND

Field of the Inventions

This application generally relates to adjustable assemblies for bicycles, and more specifically, to vertically-adjustable bicycle saddle posts and handlebar assemblies.

Description of the Related Art

In certain situations, it may be desirable for a cyclist to selectively raise or lower the saddle, handlebar assembly and/or other bicycle assembly while he or she is riding the bicycle. For example, it may be advantageous to lower the saddle when going downhill. Further, it may be advantageous to raise the saddle when climbing a hill. The height of the bicycle saddle may be important in determining a rider's power efficiency. In addition, extended use of a bicycle that has an improperly positioned saddle may lead to discomfort and/or injury. Adjustable seat post assemblies are known in the prior art. However, such seat post assemblies are often overly complicated, unreliable and/or difficult to operate or maintain. Accordingly, an improved adjustable bicycle assembly is disclosed herein.

SUMMARY

According to some embodiments, an adjustable assembly for a bicycle includes a first support having an interior surface and a second support slidably positioned within at least a portion of the first support. In one embodiment, one of the first support and the second support is adapted to attach to a first bicycle portion, and the other of the first support and the second support is adapted to attach to a second bicycle portion. In some arrangements, one of the first and second supports is permanently attached to or made a part of the frame of the bicycle. Further, the second support comprises an expansion portion configured to be moved between an expanded position and a retracted position. The expansion portion is configured to engage the interior surface of the first support when the expansion portion is in an expanded position. In addition, the first support is configured to be selectively moved relative to the second support when the expansion portion is permitted to assume a retracted position. In some embodiments, the first bicycle portion comprises a bicycle frame and the second bicycle portion comprises a bicycle saddle. In other arrangements, the first bicycle portion comprises a fork assembly and the second bicycle portion comprises a handlebar assembly.

According to some embodiments, a bicycle includes an adjustable assembly. In some arrangements, the assembly includes a first support configured to attach to a first bicycle portion, the first support having an interior surface. The assembly further includes a second support configured to attach to a second bicycle portion, the second support being slidably positioned within the first support. The second support includes a movable portion configured to engage the interior surface of the first support when the movable portion is in an expanded position. In one embodiment, the assembly further includes a retention assembly configured to slidably move at least partially into or out of an interior space of the movable portion, such that the movable portion is generally not permitted to retract inwardly when the retention assembly is positioned within the interior space of the movable portion. Further, the assembly comprises an actuator configured to selectively move the retention assembly into or out of the interior space of the movable portion. In some embodiments, the second support can be selectively moved relative to the first support when the retention assembly is moved out of the interior space of the movable portion. Moreover, the second support is configured to be stationary relative to the first support when the retention assembly is positioned within the interior space of the movable portion. In some arrangements, the first bicycle portion comprises a bicycle frame and the second bicycle portion comprises a bicycle saddle. In other embodiments, the first bicycle portion comprises a fork assembly and the second bicycle portion comprises a handlebar assembly.

According to some embodiments, a method of adjusting the vertical position of a bicycle component comprises providing an adjustable assembly having an outer support and an inner support. In some arrangements, the inner support is slidably positioned within the outer support. Further, the inner support includes an expansion portion configured to engage an interior surface of the outer portion when the expansion portion is in an expanded position. The adjustable assembly further includes a biasing assembly configured to urge the inner support relative to the outer support. In one embodiment, the assembly additionally comprises an actuator configured to selectively permit the expansion portion to be either in a locked orientation wherein the expansion portion is maintained in the expanded position or an unlocked orientation wherein the expansion portion is generally allowed to move into a retracted position.

In some arrangements, the inner support is configured to be selectively slidably moved relative to the outer support when the expansion portion is in the unlocked orientation. Further, the inner support is configured to be generally stationary relative to the outer support when the expansion portion is in the locked orientation. The method further includes securing the outer portion of the adjustable assembly to a first bicycle portion and securing the inner portion of the adjustable assembly to a second bicycle portion. In some arrangements, the method additionally comprises selectively raising the second bicycle portion relative to the first bicycle portion by reducing downward forces on the second bicycle portion and moving the actuator so that the expansion portion is in the unlocked orientation, or selectively lowering the second bicycle portion relative to the first bicycle portion by exerting a downward force on the second bicycle portion and moving the actuator so that the expansion portion is in the unlocked orientation. In addition, the method includes maintaining a selected vertical position of the second bicycle portion by moving the actuator so that the expansion portion is in the locked orientation. According to some embodiments, the first bicycle portion comprises a bicycle frame and the second bicycle portion comprises a bicycle saddle. In other arrangements, the first bicycle portion comprises a fork assembly and the second bicycle portion comprises a handlebar assembly.

In some embodiments, an adjustable seat post assembly for a bicycle includes a first support having an interior surface and a second support slidably positioned within at least a portion of the first support. In one arrangement, the first support is adapted to attach to a bicycle frame, and the second support is adapted to attach to a bicycle saddle. In an alternative embodiment, the second support is adapted to attach to a bicycle frame, and the first support is adapted to attach to a bicycle saddle. Further, the second support includes a collet or other expansion portion that is adapted to be moved between an expanded position and a retracted position. The collet or other expansion portion is configured to engage the interior surface of the first support when the expansion portion is in an expanded position. In addition, the first support is configured to be selectively moved relative to the second support when the expansion portion is permitted to assume a retracted position.

In some embodiments, the interior surface of the first support comprises a plurality of grooves, and the expansion portion is configured to engage one of the grooves when in an expanded position. In other arrangements, the expansion portion comprises a collet or another expandable member. In one embodiment, the collet is slotted and/or is otherwise configured to facilitate retraction and/or expansion. In some embodiments, the collet or other expansion portion comprises spring steel and/or other resilient materials. In another embodiment, the second support comprises a main body portion, and the expansion portion is separately formed with the main body portion. In alternative embodiments, the expansion portion is integrally formed with the second support.

According to some embodiments, the adjustable seat post further includes a biasing assembly configured to urge the support (e.g., the first support or the second support) that is attached to the bicycle saddle relative to the support (e.g., the second support or the first support) that in attached to the bicycle frame. In one embodiment, the expansion portion is in an expanded position while in a resting state when no external forces are exerted on the expansion portion, such that the expansion portion normally engages one of the grooves of the first support. In some arrangements, the expansion portion comprises a collet or other expandable portion.

In some embodiments, the first support and the second support of an adjustable seat post include a generally cylindrical or other tubular shape. In other embodiments, the outer support and the inner support comprise a different shape. In other embodiments, the grooves are circumferentially located around the interior surface of the first support. In one arrangement, the adjustable seat post assembly further comprises a retention assembly configured to slidably move at least partially within or out of an interior space of the expansion portion. In some embodiments, the expansion portion is generally not permitted to retract inwardly when the retention assembly is positioned within the interior space of the expansion portion. In some embodiments, the retention assembly comprises a bearing portion, a locking portion and/or any other portion or component.

According to some embodiments, a retention assembly and/or any other member is normally resiliently biased at least partially within the interior space of the expansion portion. In other arrangements, the adjustable seat post assembly further includes a connector mechanically attached to the retention assembly (e.g., bearing portion, locking portion, etc.) or any other member, such that movement of the connector in a first direction moves the retention assembly and/or one or more of its portions or components (e.g., bearing portion, locking portion, etc.) within the interior space of the expansion portion. Further, and movement of the connector in a second direction moves the retention assembly and/or one or more of its portions or components bearing portion out of the interior space of the expansion member, the second direction being generally opposite of the first direction. In some embodiments, the connector comprises a cable, a rod or other actuator.

In some embodiments, the connector is operatively connected to a lever configured to be manipulated while the bicycle is being ridden. In other arrangements, the seat post assembly further includes a lock pin operatively connected to the connector and the retention assembly. In one embodiment, the lock pin is configured to prevent the expansion portion from retracting inwardly when positioned within the interior space of the expansion portion.

According to other embodiments, a bicycle includes an adjustable seat post device or assembly which comprises a first support configured to attach to a bicycle frame and a second support configured to attach to a bicycle saddle. In some embodiments, the first support includes an interior surface, and the second support is slidably positioned within the first support. In one arrangement, the second support includes a movable portion configured to engage the interior surface of the first support when the movable portion is in an expanded position. The adjustable seat post further includes a retention assembly and/or any other member configured to slidably move at least partially into or out of an interior space of the movable portion. In one embodiment, the movable portion is generally not permitted to retract inwardly when the retention assembly is positioned within the interior space of the movable portion. In some embodiments, the retention assembly comprises a bearing portion a locking portion and/or any portion or component. In other arrangements, the seat post further comprises a cable, a rod or other actuator configured to selectively move the retention assembly (e.g., the bearing portion, locking portion and/or any other portion or component of the retention assembly) into or out of the interior space of the movable portion. In some embodiments, the second support can be selectively moved relative to the first support when the retention assembly and/or other members are moved out of the interior space of the movable portion. In some embodiments, the second support is configured to be stationary relative to the first support when the retention assembly and/or other members are positioned within the interior space of the movable portion.

In some arrangements, the interior surface of the first support comprises a plurality of grooves. In one embodiment, the movable portion of the second support is configured to engage one of the grooves when the movable portion is in an expanded position. In other embodiments, the second support comprises a main body portion. In another embodiment, the movable portion is separately formed with the main body portion.

According to some embodiments, the movable portion is integrally formed with the second support. In other arrangements, the movable portion of the second support comprises an expansion portion. In one embodiment, the expansion portion comprises a collet or other expandable member. In some embodiments, the collet is slotted or includes other features that help it to retract or expand. In some arrangements, the second support comprises an upper end and a lower end, the movable portion being positioned at or near said lower end of the second support. In other embodiments, the movable portion is positioned along any other portion of the second support.

In some embodiments, the seat post assembly of the bicycle further comprising a biasing assembly configured to urge the second support relative to the first support. In one arrangement, the retention assembly is normally resiliently biased at least partially within the interior space of the movable portion. In other embodiments, the actuator comprises a connector mechanically attached to the retention assembly, which is configured to be moved out of the interior space of the movable portion when the connector is generally moved. In some embodiments, the connector comprises a cable, a rod or other actuator. In other embodiments, the connector is operatively connected to a lever or other actuation device located near a handlebar area of the bicycle. In some embodiments, the connector is operatively attached to a lever or other actuation device positioned underneath the saddle or positioned along any other location of the bicycle.

According to some arrangements, a method of adjusting the vertical position of a saddle of a bicycle includes the step of providing an adjustable seat post assembly. In some embodiments, the seat post assembly includes an outer support and an inner support slidably positioned within the outer support. In some arrangements, the inner support includes an expansion portion configured to engage an interior surface of the outer portion when the expansion portion is in an expanded position. In some embodiments, the adjustable seat post assembly further comprises a biasing assembly configured to urge the inner support relative to the outer support, and an actuator configured to selectively permit the expansion portion to be either in a locked orientation wherein the expansion portion is maintained in the expanded position or an unlocked orientation wherein the expansion portion is generally allowed to move into a retracted position.

In some embodiments, the inner support is configured to be selectively slidably moved relative to the outer support when the expansion portion is in an unlocked orientation. In other embodiments, the inner support is configured to be generally stationary relative to the outer support when the expansion portion is in a locked orientation. In some arrangements, the method of adjusting the vertical position of a bicycle saddle further includes the steps of securing the outer portion of the seat post assembly to a bicycle frame and securing the inner portion of the seat post assembly to a bicycle saddle. In one embodiment, the method further comprises selectively raising the bicycle saddle relative to the bicycle frame by reducing a weight or other downward forces on the bicycle saddle, and moving the actuator so that the expansion portion is in the unlocked orientation, or selectively lowering the bicycle saddle relative to the bicycle frame by exerting weight and/or other downward forces on the bicycle saddle and moving the actuator so that the expansion portion is in an unlocked orientation. In some arrangements, the method of adjusting the vertical position of a bicycle saddle further includes maintaining a selected vertical position of the bicycle saddle by moving the actuator so that the expansion portion is in a locked orientation.

In some arrangements, the expansion portion comprises a slotted collet, another type of collet or some other expandable member. In one embodiment, the actuator includes a connector (e.g., cable, rod, other actuator, etc.) and a lever, the lever being operatively connected to the connector. In some embodiments, selectively raising or lowering the bicycle saddle comprises moving the lever from a first position to a second position, against a resilient force. In other embodiments, maintaining a selected position comprises releasing the lever so that the lever moves to the first position.

BRIEF DESCRIPTION OF THE DRAWINGS

These and other features, aspects and advantages of the present inventions are described with reference to drawings of certain preferred embodiments, which are intended to illustrate, but not to limit, the present inventions. The drawings include seventeen (17) figures. It is to be understood that the attached drawings are for the purpose of illustrating concepts of the present inventions and may not be to scale.

DETAILED DESCRIPTION OF THE PREFERRED EMBODIMENTS

This application is directed to a vertically-adjustable assembly for a bicycle that is desirably configured to permit a user to selectively raise and/or lower a bicycle component or other portion of the bicycle even while he or she is riding the bicycle. The adjustable assembly and the various systems and features associated with it are described in the context of a bicycle saddle because they have particular utility in this context. However, the adjustable post assembly and methods described herein, as well as their various systems and features, can be used in other contexts as well, such as, for example, but without limitation, the front fork and handlebar area of a bicycle or any other portion of a bicycle. For convenience, the adjustable assembly is described herein with specific reference to an adjustable seat post assembly.

Figure 1:
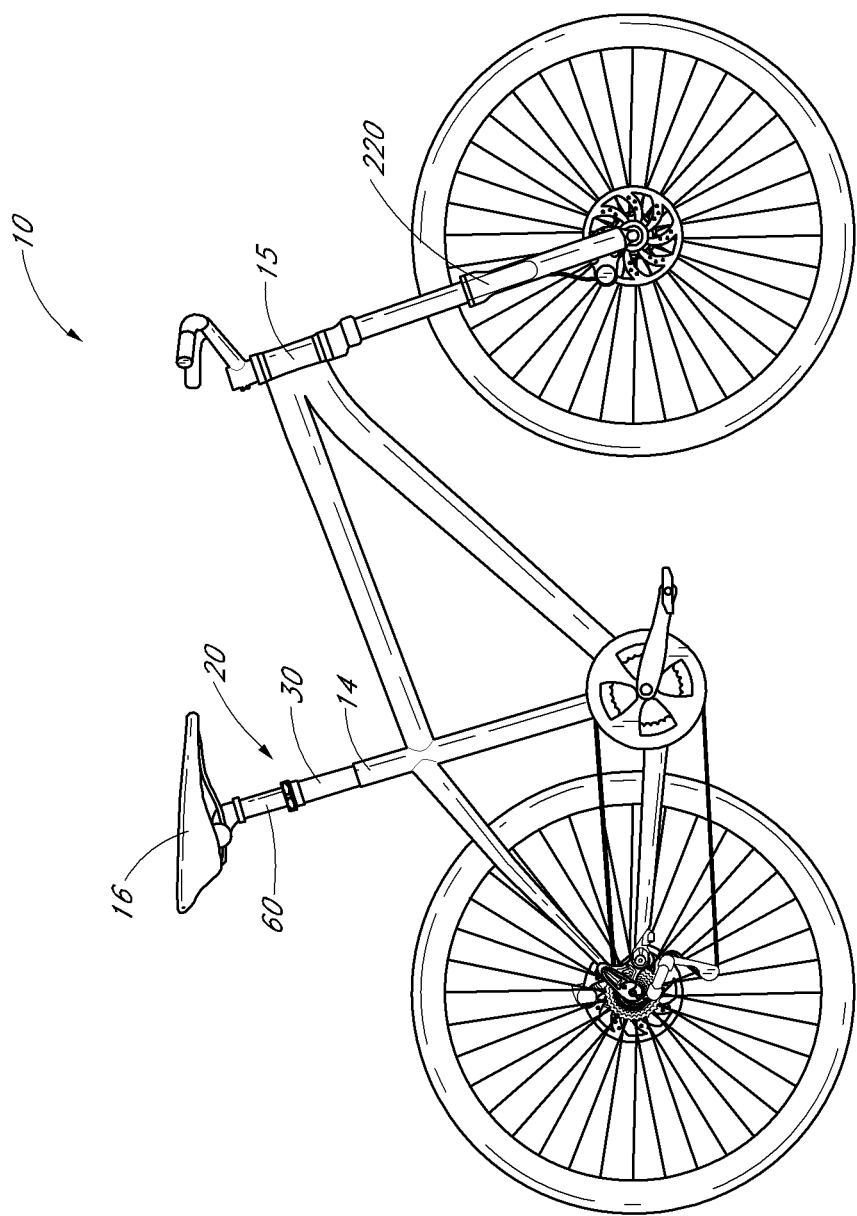
FIG. 1 illustrates a side view of a bicycle comprising an adjustable saddle post assembly according to one embodiment.
Figure 2:
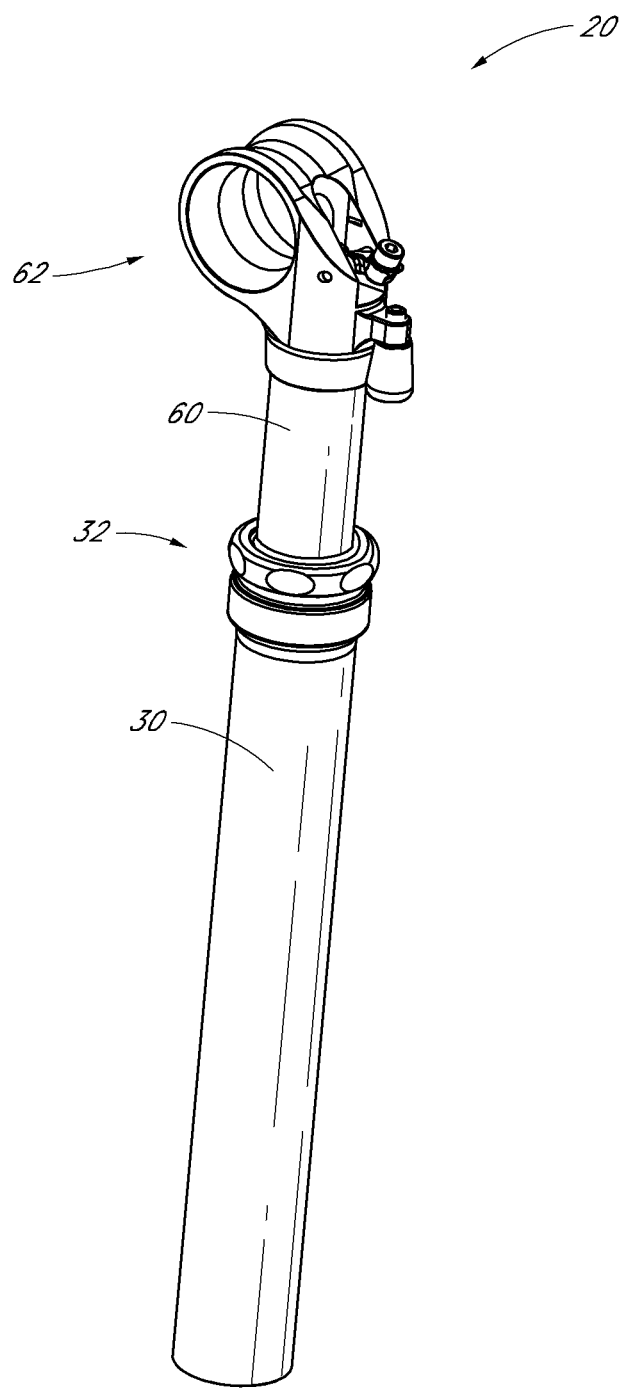
FIG. 2 illustrates a perspective view of an adjustable saddle post assembly according to one embodiment.

As illustrated in FIG. 2, the seat post assembly 20 can include an inner support 60 that is configured to be slidably moved relative to an outer support 30. A bicycle saddle 16 (FIG. 1) or other seat member can be attached to an upper portion of the inner support 60 (e.g., saddle head 62). In some embodiments, the outer support 30 is attached to the bicycle frame 14 (FIG. 1). Further, in other embodiments, the outer support 30 can be permanently attached to or be made a part of the bicycle frame. Accordingly, vertical movement of the inner support 60 relative to the outer support 30 can allow a seated occupant to selectively raise or lower the saddle as desired.

With continued reference to the embodiment depicted in FIGS. 1 and 2, the outer support 30 is configured to attach to the bicycle frame 14, while the inner support 60 is configured to attach to the saddle 16 or other seat member. As discussed, the outer support 30 can be incorporated into the bicycle frame. Alternatively, however, the outer support 30 can be configured to attach to the saddle 16 or other seat member and the inner support 60 can be configured to attach to the bicycle frame 14.

In addition, the seat post assembly 20 can be permanently or removably attached to the bicycle frame 14 and/or the saddle 16, as desired or required. For example, the outer support 30 of the seat post assembly 20 can be a part of the frame 14. In one arrangement, the seat post assembly 10 is secured to the bicycle frame 14 using a clamping device, a mechanical fastener and/or the like.

Figure 3:
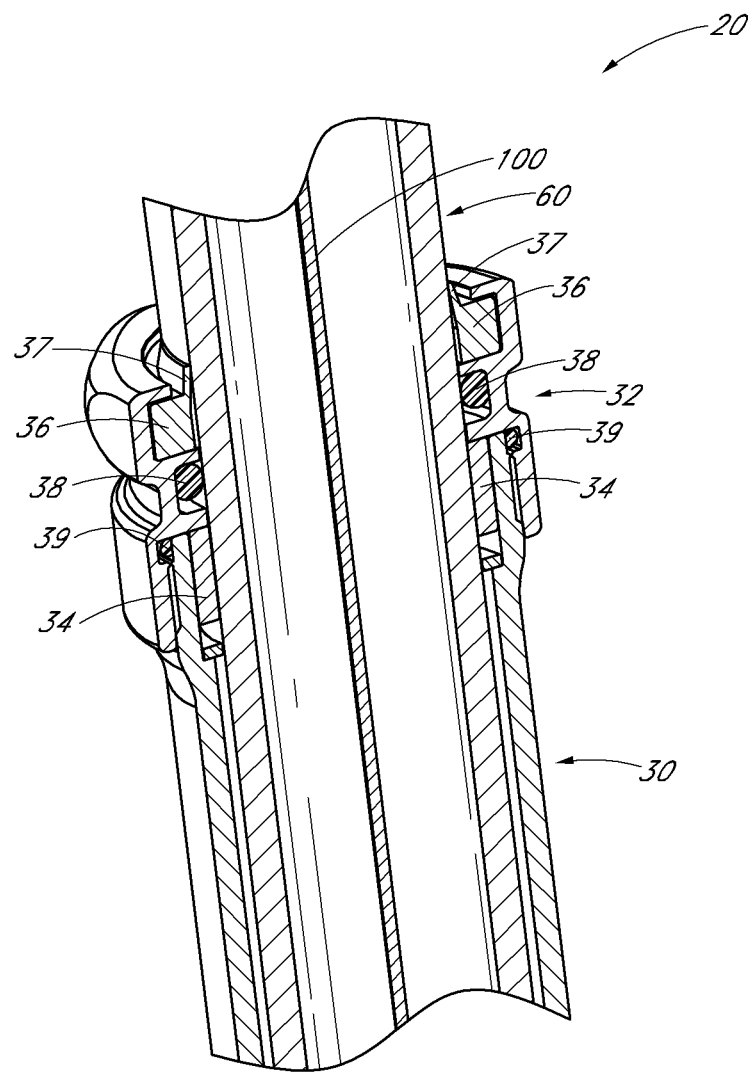
FIG. 3 illustrates a partial perspective, cross-sectional view of the adjustable saddle post of FIG. 2.

As illustrated in FIG. 3, the outer support 30 can include a seal head portion 32 at or near its upper end. The seal head portion 32 can be advantageously configured to prevent fluids, solids (e.g., dust) or any other materials from entering the interior of the outer support 30 and/or inner support 60. In addition, as discussed in greater detail herein, the seal head portion 32 can help prevent air or other fluids from escaping a chamber 58 or other internal portion of the seat post assembly 20. In some embodiments, the seal head portion 32 comprises a circumferential wiper 36 that generally abuts and contacts an outer surface of the inner support 60. The wiper 36 can comprise one or more elastomeric (e.g., rubber), thermoplastic or other flexible, rigid or semi-rigid or materials.

In the depicted arrangement, the wiper 36 comprises a lip portion 37 or other member that is resiliently biased toward an outer surface of the inner support 60. As a result of such a design, the likelihood of fluids, solids and/or other materials leaking or otherwise escaping the space between the inner support 60 and outer support 30 is reduced. In addition, one or more other sealing members can be used to prevent or minimize fluids and/or other materials from entering or leaving an interior of the seat post assembly 20 through the seal head portion 32, either in lieu of or in addition to the wiper 36. For example, the seal head portion 32 can comprise one or more O-rings 38, 39 or other sealing members, as desired or required.

Figure 4:
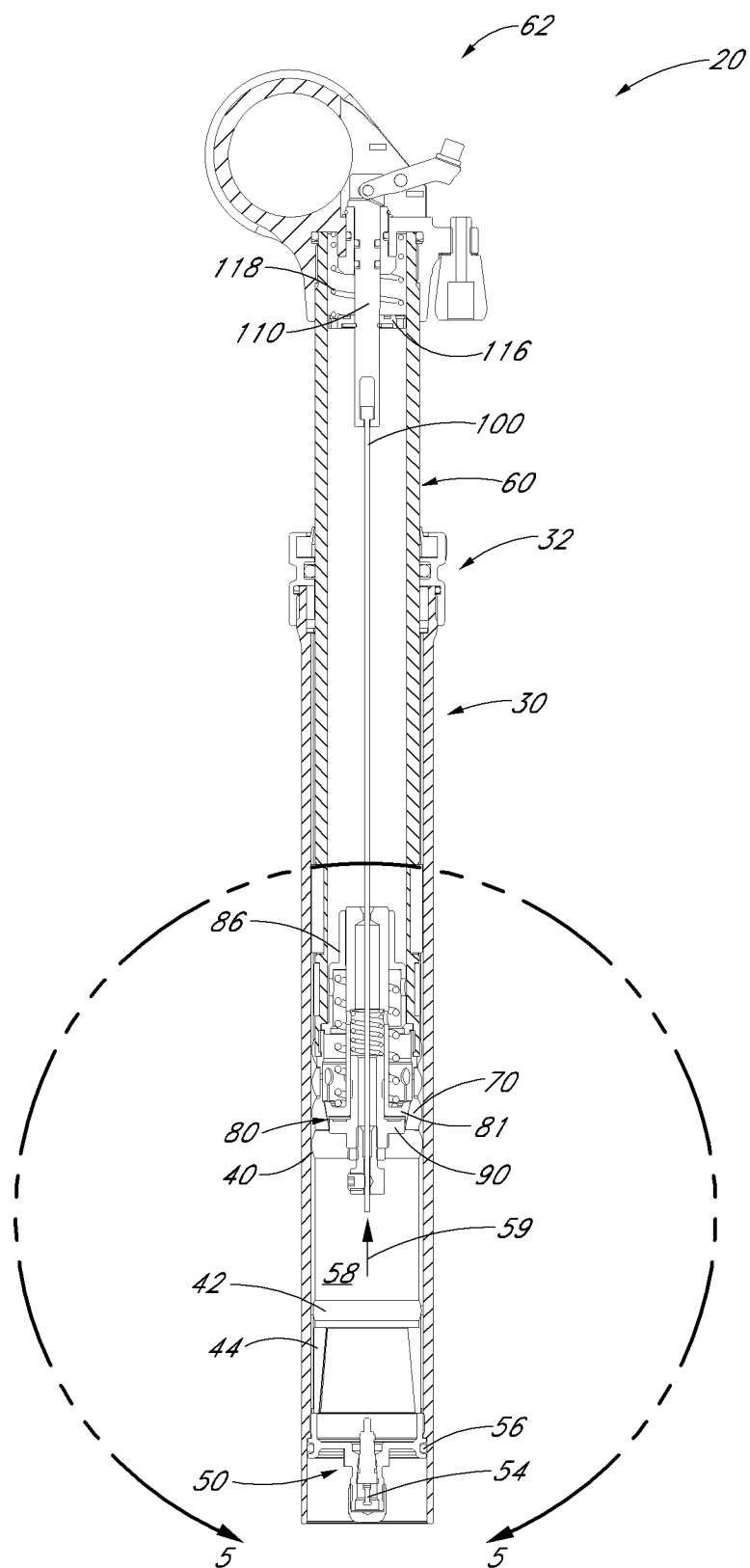
FIG. 4 illustrates a cross-sectional view of the adjustable saddle post assembly of FIG. 2.
Figure 5:
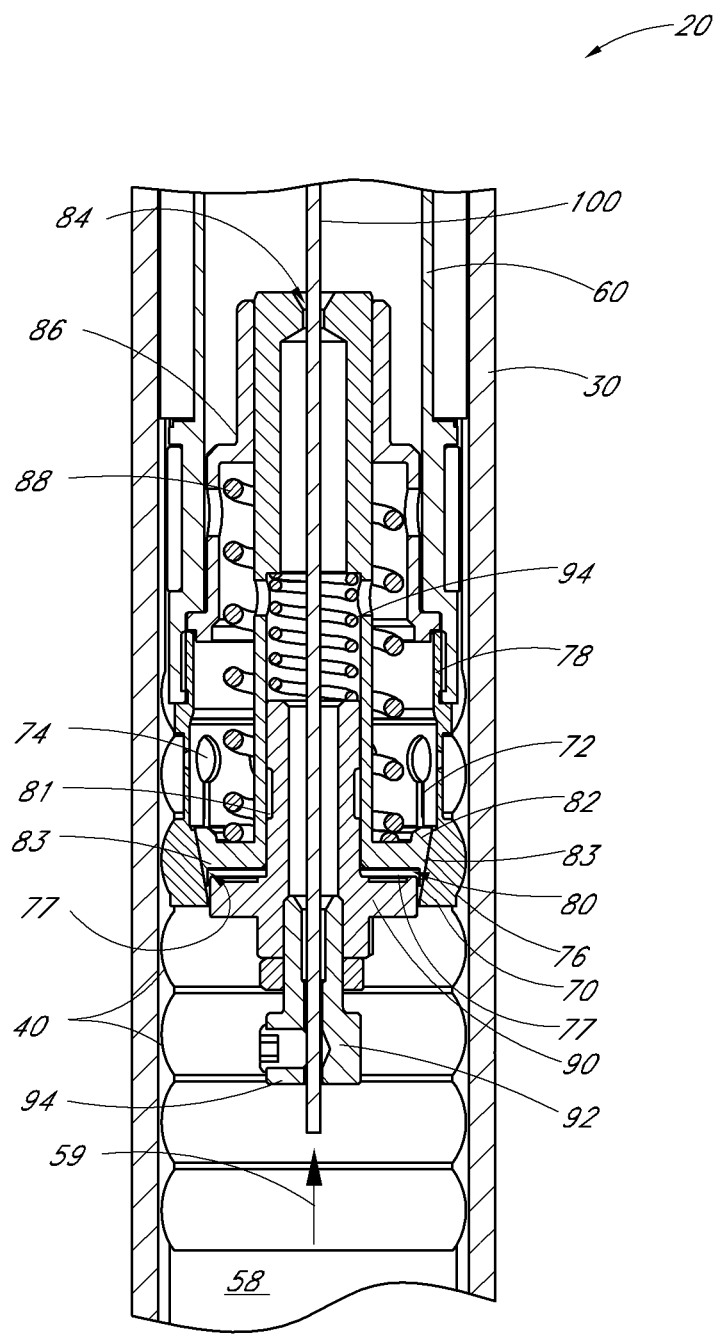
FIG. 5 illustrates a detailed cross-sectional view of the adjustable saddle post of FIG. 4.

With reference to the cross-sectional views illustrated in FIGS. 4 and 5, the outer support 30 can comprise a plurality of circumferential grooves 40, recesses or other features along its interior surface. As discussed in greater detail herein, the grooves 40 along the interior of the outer support 30 are preferably sized, shaped and otherwise adapted to be engaged by a collet or other expandable portion of the inner support 60. In the depicted arrangement, the outer support 30 includes a total of eight grooves 40 that are situated immediately adjacent to each other. In addition, each of the illustrated grooves 40 can include an identical or substantially identical curved shape. However, in other embodiments, the quantity, size, shape, spacing, location and/or other details of the grooves 40 can vary, as desired or required by a particular application or use. For example, the radius of curvature of the grooves 40 can be greater or less than illustrated herein. In addition, the grooves 40 can extend along a greater or lesser portion of the interior of the outer support 30.

The outer support 30, the inner support 60 and/or any other portion of the seat post assembly 20 can comprise one or more materials, such as, for example, aluminum, titanium, steel, other metals or alloys, carbon fiber, thermoplastics and/or the like. Regardless of the exact materials or combination of materials used, the outer and inner supports 30, 60 are preferably designed to withstand the various forces, moments and other stresses to which they may be subjected. The grooves 40 along the interior of the outer support 30 and/or any other feature along the inside or outside of the outer or inner supports 30, 60 can be formed at the same time that such supports are manufactured. Alternatively, the grooves 40 or any other feature can be machined or otherwise formed subsequent to the manufacture of the supports 30, 60 using one or more forming methods.

With continued reference to FIG. 4, the lower portion of the outer support 30 can include a pad 44 or other bottom portion that prevents the inner support 60 from being lowered beyond a desired threshold location. As shown, the lower portion of the outer support 30 can also include a lower groove 42, which the collet 70 or other expandable portion of the inner support 60 can generally engage when the inner support 60 is moved to or near such lower threshold position or other lowest setting relative to the outer support 30.

As illustrated in FIG. 4, the lower portion of the outer support 30 can comprise a spring or air plug assembly 50. In some embodiments, the air plug assembly 50 is situated below the pad 44 or other portion or member which vertically restricts the further lowering of the inner support 60 within the outer support 30. The air plug assembly 50 can be configured to maintain a volume of pressurized air or other fluid within the interior of the outer support 30. For example, in the depicted arrangement, the air plug assembly 50 extends across the entire cross-sectional area of the outer support 30. One or more O-rings 56 or other sealing members can be generally positioned between the circumferential edges of the air plug assembly 50 and the interior wall of the outer support 30 to help maintain air or other fluids within the interior of the outer support 30. Further, a seal head portion 32 can also help maintain a desired air spring.

With continued reference to FIG. 4, the air plug assembly 50 can include a Schrader valve 54 or other air regulating device. The Schrader valve 54 or other type of valve can be configured to permit a user to inject air or other fluids within the cavity 58 in the outer support formed above the air plug assembly 50. As discussed in greater detail herein, the cavity 58 can be pressured using air or other fluids in order to create an air spring that effectively exerts a force on the inner support 60 (e.g., the portions of the inner support 60 that are immediately adjacent to the cavity 58). In the illustrated embodiment, the Schrader valve is accessible from the bottom, open end of the outer support 30. However, in other arrangements, the Schrader valve or any other type of valve can be positioned along a different part of the seat post assembly 20. Further, a coiled spring, a different type of resilient member or another type of device or method can be used to exert a force on the inner support 60, either in lieu of or in addition to an air spring.

As illustrated in FIG. 4, the adjustable seat post assembly 20 can comprise an inner support 60 that is slidably positioned relative to the outer support 30. In some embodiments, as illustrated herein, the outer and inner supports 30, 60 comprise generally hollow, cylindrical tube shapes. However, in other arrangements, the shape, size, thickness and/or other details of the support 30, 60 can vary, as desired or required. In the depicted arrangement, the inner support is configured to be placed within the top end of the outer support 30. However, as discussed herein, the seat post assembly 20 can be differently configured so that the positions of the inner support 60 and the outer support 30 can be reversed (e.g., the inner support can be placed within a bottom end outer support).

With continued reference to FIGS. 4 and 5, the inner support 60 can include a collet or other expandable portion 70 along its lower end. The expandable portion 70 can comprise a slotted collet, another type of resilient member or other nonresilient expandable member. In the depicted embodiment, the expandable portion 70 is a separate member that is secured to the inner support 60. The expandable portion 70 and the adjacent surfaces of the inner support 60 can be machined to include one or more features (e.g., grooves, other recesses, protrusions, etc.) that can be used to mechanically engage each other. Alternatively, the expandable portion 70 and the inner support 60 can be connected using one or more other attachment devices or methods, such as, for example, tabs, screws, welds, rivets, fasteners, flanges, adhesives, friction-fit connections and/or the like. In other arrangements, the inner support 60 is integrally formed with the expandable portion 70. In FIGS. 4 and 5, the collet 70 is generally secured at the end of the inner support 60. However, the collet 70 or other expandable portion can be positioned along any other location of the inner support 60.

Figure 7:
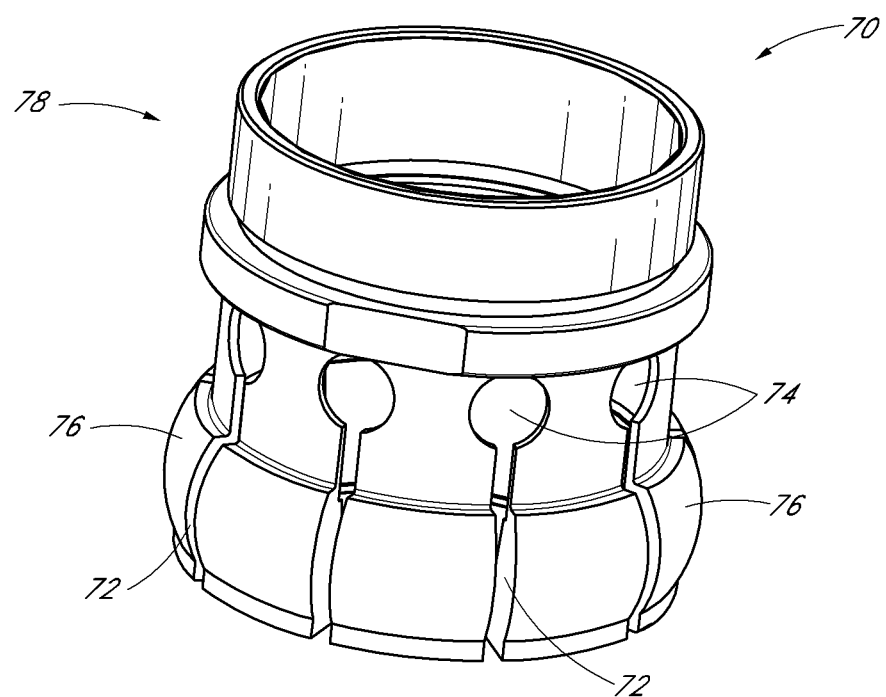
FIG. 7 illustrates a perspective view of a collet configured for use in an adjustable saddle post assembly as disclosed herein according to one embodiment.

FIG. 7 illustrates a perspective view of one embodiment of a collet 70 adapted to be attached to the inner support 60 of the seat post assembly 20. As shown, the collet 70 can include one or more slots 72 and/or other features that permit it to resiliently contract inwardly. In the depicted arrangement, each of the slots 72 is vertically oriented and terminates at a circular opening 74 located along the collet body. The slots 72 desirably divide the collet 70 into a series of collet sections or arms 75.

Figure 6:
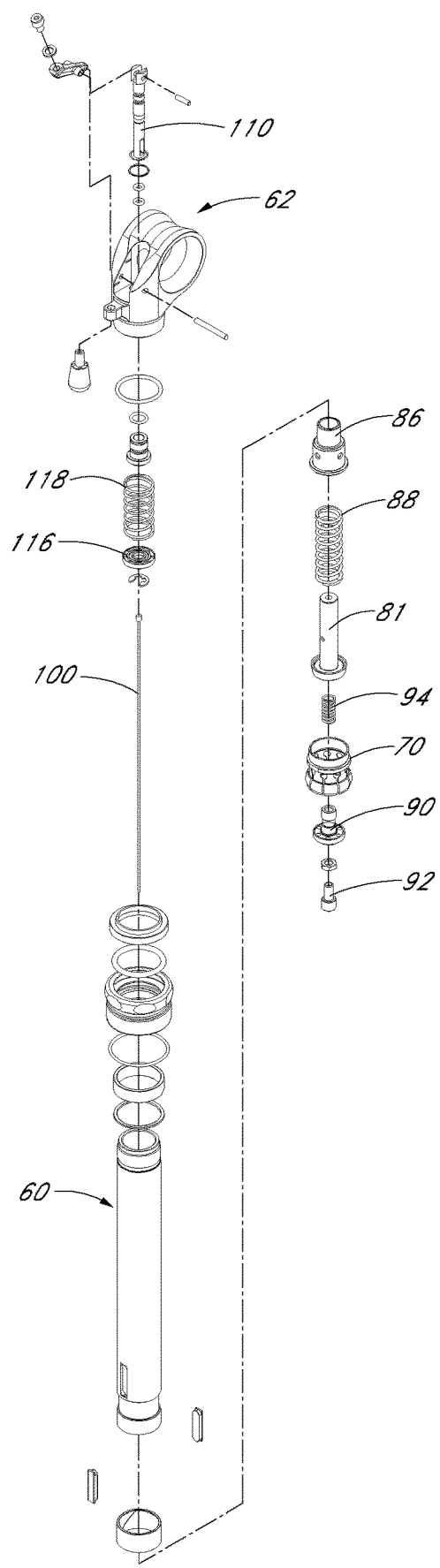
FIG. 6 illustrates an exploded perspective view of the inner support of the adjustable saddle post assembly of FIGS. 2-5.

With continued reference to FIGS. 4-6, the collet 70 can include a projecting portion 76 that is configured to engage one of the grooves 40 positioned along the interior wall of the outer support 30. However, one or more other areas of the collet 70 or other expandable portion of the inner support 60 can be adapted to engage a groove 40 of the outer support 30. In other embodiments, the collet 70 or other expandable portion is configured to engage an interior of the outer support 30 along an area that does not include any grooves 40 or other distinguishing features (e.g., a generally smooth surface of the internal surface of the outer support 30).

The quantity, size, shape, spacing and/or other details of the slots 72, openings 74, and/or arms 75 of the collet 70 can vary, as desired or required. For example, in some embodiments, the collet 70 may not include any slots or openings at all. Instead, the collet 70 can be configured so that one or more of its portions can be resiliently contracted and expanded (e.g., circumferentially). Alternatively, the slots between certain collet arms could be very wide, such that there is a large angular portion of the circumference of the collet 70 which does not have a physical structure which mates with the grooves of the outer support. Desirably, however, the arms define projecting portions which extend at least 180 degrees, at least 240 degrees, at least 270 degrees, at least 300 degrees, at least 320 degrees and preferably substantially entirely around the 360 degree circumference of the collet.

As illustrated in FIGS. 4 and 5, the projecting portion 76 of the collet 70 or other expandable portion of the inner support 60 can be shaped, sized and otherwise configured to match or substantially match the shape of the grooves 40 positioned along the interior wall of the outer support 30. Accordingly, the projecting portion 76 can generally snugly engage one of the grooves when in its circumferentially expanded state. As discussed in greater detail herein, the projecting portion 76 of the collet 70 can be selectively permitted to retract inwardly in order for the collet 70 to engage a different groove 40 or other area along the interior wall of the outer support 30. Consequently, the vertical position of the inner support 60 can be selectively varied relative to the outer support 30.

In certain arrangements, the collet 70 or other expandable portion comprises spring steel and/or another resilient material. As is discussed in greater detail herein, the use of such materials permits the collet 70 or other expandable portion to retract and expand as different portions of the contoured interior wall of the outer support 30 are engaged. In one arrangement, the collet 70 is configured to remain in an expanded position (as illustrated in FIGS. 4-6) when no forces are acting on it.

The inner support 60 can include a retention assembly 80, which in some embodiments, is normally biased to at least partially fit within an interior of the collet 70 or other expandable portion. In some embodiments, as discussed in greater detail herein, the retention assembly 80 comprises a bearing portion 81 and a locking portion 90. In other arrangements, however, the retention assembly 80 can include only the bearing portion 81 or only the locking portion 90. In addition, a retention assembly 80 can include one or more other portions or members, either in addition to or in lieu of the bearing portion 81 and/or the locking portion 90. Regardless of its exact configuration, the retention assembly 80 is preferably adapted to maintain the collet 70 or other expandable portion of the inner support 60 in an expanded position so that the collet 70 or other expandable portion remains engaged to a groove 40 or other interior portion of the outer support 30. As discussed in greater detail herein, this prevents relative movement between the inner support 60 and the outer support 30, thereby maintaining the vertical position of the bicycle saddle.

As illustrated in FIG. 5, the bearing portion 81 can comprise a generally tubular upper portion and a circumferentially enlarged lower portion 82. In some arrangements, the enlarged lower portion 82 includes a tapered outer surface 83 that is sized, shaped, sloped and otherwise configured to correspond and generally mate with an adjacent tapered inner surface 77 along the projecting portion of the collet 70 when the enlarged lower portion 82 is resiliently biased thereagainst. An exploded view of one embodiment of an inner support 60 comprising a retention assembly 80 is illustrated in FIG. 6.

According to some embodiments, the inner support 60 includes one or more coil springs or other biasing members that help urge the retention assembly 80 (e.g., the bearing portion 81, the locking portion 90, etc.) toward the interior of the collet 70. For example, as shown in FIG. 5, a spring housing 86 or another similar member (e.g., plate, other abutting surface, etc.) can be used to maintain a desired biasing force against the bearing portion 81 of the retention assembly 80. As is discussed in greater detail herein, the bearing portion 81 and/or any other portion of the retention assembly 80 can be selectively moved against the biasing force of one or more springs 88 or other resilient members in order to move the enlarged lower portion 82 of the bearing portion 81 and/or any other portion of the retention assembly 80 upwardly, generally out of the interior of the projecting portion 76 of the collet 70 or other expandable portion of the inner support 60. This can advantageously permit the projecting portion 76 of the collet 70 to be retracted when a sufficiently large upwardly or downwardly force is applied to the inner support 60. Consequently, the inner support 60 can be slidably moved relative to the outer support 30. Thus, the vertical position of a saddle or other seating member attached to the inner support 60 can be selectively changed.

As discussed, the retention assembly 80 can help to maintain or "lock" the projecting portion 76 of the collet 70 in its normally expanded state to prevent relative movement between the outer and inner supports 30, 60. To further ensure that the projecting portion 76 remains expanded, the retention assembly 80 can include a locking portion 90 or other similar portion, feature or device. In the embodiment depicted in FIGS. 4 and 5, the locking portion 90 is generally positioned underneath and immediately adjacent to the bearing portion 81. As shown, the locking portion 90 can be slidably positioned with a center cavity of the bearing portion 81. In other arrangements, however, the relative position of the bearing portion 81 and the locking portion 90, the manner in which such components interact and/or other details of these components can vary, as desired or required.

Similar to the bearing portion 81, the locking portion 90 can be resiliently biased toward an interior portion of the projecting portion 76 of the collet 70 using one or more coil springs 94 or other resilient members. For example, as shown, a spring 94 can be positioned within an interior cavity portion of the bearing portion 81 so that it exerts a downwardly-directed force on the locking portion 90. In the illustrated arrangement, the locking portion 90 is configured to contact the enlarged lower portion 82 of the bearing portion 81 if it is moved sufficiently far against the urging force of the spring 94 (e.g., upwardly as depicted). Therefore, in order to move the lower portion 82 of the bearing portion 81 out of the projecting portion 76 of the collet 70, the locking portion 90 is moved (e.g., upwardly as illustrated in FIG. 5) until it contacts the enlarged lower portion 82 of the bearing portion 81. Then, the continued movement of the locking portion 90 will cause the locking portion 90 and bearing portion 81 to simultaneously move against the biasing force of one or more springs 88, 94. If the retention assembly 80 (e.g., the locking portion 90, the bearing portion 81, etc.) are moved far enough away from the interior of the projecting portion 76 of the collet 70 (or other expandable portion), the collet 70 can be allowed to retract inwardly so that the inner support 60 may be moved relative to the outer support 30.

Although in the embodiments illustrated and discussed herein the retention assembly 80 includes a bearing portion 81 and a locking portion 90, it will be appreciated that the retention assembly 80 may only have a bearing portion 81 or similar device to prevent the collet 70 or other expandable portion of the inner support 60 from retracting inwardly. Alternatively, the retention assembly 80 may only include a locking portion 90 and no bearing portion 81. However, in some embodiments, the use of an expanding portion or other portion having sloped exterior surfaces, such as, for example, the bearing portion 81, is preferred, because such a portion helps ensure that the secure mating of the collet 70 with the grooves, despite wear or manufacturing. In addition, in other arrangements, the adjustable post assembly 20 can comprise a completely different method of ensuring that the collet 70 or other expandable portion of the inner support 60 remains engaged with a groove 40 or other portion of the outer support. For example, the retention assembly 80 that is configured to maintain the collet 70 or other expandable portion of the inner support 60 can comprise a less or more complicated design. In some embodiments, the retention assembly 80 comprises only a single portion and/or component (e.g., a bearing portion 81, a locking portion, any other portion or member, etc.). In other arrangements, the retention assembly 80 includes two, three, four or more different portions and/or components.

In some embodiments, an actuation device or system can be used to move the retention assembly 80 (e.g., the bearing portion 81, the locking portion 90, etc.) and/or any other portion of the seat post assembly 20. With reference to FIGS. 4 and 5, a cable 100, rod, connector or other movable portion that extends through the interior of the inner support 60 is operatively connected to a cable lock member 92 situated below the bearing portion 81 and the locking portion 90. In the illustrated arrangement, the cable lock member 92 is secured to the adjacent locking portion 90 using one or more connection devices or methods, such as, for example, threaded fasteners, rivets, other type of fasteners, welds, pins, adhesives and/or the like. Alternatively, the cable lock member 92 can be attached to the bearing portion 81 and/or any other portion of the retention assembly 80, either in addition to or in lieu of simply being attached to the locking portion 90.

With continued reference to the cross-sectional views of FIGS. 4 and 5, the cable 100, rod, connector or other movable member can be inserted within a passage of the cable lock member 92. Further, the cable 100 can be secured to the cable lock member 92 by inserting and tightening a set screw or other fastener within one or more lateral openings 94. However, one or more alternative devices or methods may be used to secure the cable 100 to the cable lock member 92. The cable 100, rod, connector or other movable member preferably comprises one or more durable materials configured to withstand the forces and stresses to which it may be exposed during use of the adjustable seat post assembly 20. For instance, the cable 100 can comprise one or more metals (e.g., steel), thermoplastics, composites and/or the like.

In the embodiments of the adjustable seat post assembly illustrated herein, the cable 100 is configured to be routed through or near the axial center of the inner support 60. Accordingly, one or more of the components of the inner support 60 may need to be configured to accommodate the unobstructed passage of the cable therethrough. As shown, for example, the upper cylindrical portion of the retention assembly 80 (e.g., bearing portion 81, locking portion 90, etc.) can include an opening 84 through which the cable 100 is routed. In addition, the cable 100 can be routed through one or more other components of the seat post assembly 20, including, but not limited to, springs 88, 94, the spring housing 86, the collet 70 or other expandable portion and/or the like.

In FIG. 4, the cable 100, rod or other movable member is attached to a pull rod assembly 110 located at or near the upper end of the inner support 60. As discussed herein with respect to the connection between the cable 100 and the cable lock member 92, one or more devices or methods can be used to secure the cable 100 to the pull rod assembly 110. In some embodiments, a desired amount of tension can be maintained in the cable 100 situated within the seat post assembly 20. In the illustrated arrangement, such tension in the cable 100 is created by positioning a spring 118 or other resilient member between a top interior surface of the inner support 60 and a spring plate 116 that is attached to the pull rod assembly 110. In turn, the pull rod assembly 110 can be mechanically connected to another cable (not shown), rod or other member that is configured to operatively connect the pull rod assembly 110 and the cable 100 to a lever, switch, button and/or other actuation device. In some embodiments, such a lever or other actuation device is positioned at or near the handlebar area of a bicycle to permit a user to conveniently manipulate the seat post assembly. Alternatively, the pull rod assembly 110 and the cable 100 can be operatively connected to a lever or other actuation device located at a different location of the bicycle (e.g., underneath the saddle, along one or more of the frame members, etc.).

As discussed, when the cable 100 is retracted from its resting position (e.g., moved upwardly as illustrated in FIGS. 4 and 5), a retention assembly 80 (e.g., the bearing portion 80, the locking portion 90 and/or any other portions or components of the retention assembly 80) may be moved away from the interior of the projecting portion 76 of the collet 70 or other expandable portion formed with or attached to the inner support 60. Consequently, the collet 70 or other expandable member can be permitted to retract inwardly so that its projecting portion 76 can selectively engage another groove 40 or another interior surface of the inner support 60. Likewise, when the cable 100 is permitted to resiliently revert to its resting position (e.g., with the assistance of one or more springs 88, 94, 118 or other biasing members), the retention assembly 80 can move within the interior of the projecting portion of the collet 70, thereby restricting or limiting the collet's ability to retract inwardly. As discussed in greater detail herein, this can help prevent or reduce relative movement between the outer support 30 and the inner support 60.

In use, air or other fluids may be injected into the outer support 30 through the Schrader valve 54 using a pump or some other fluid delivery device. The amount of air or other fluid that is placed within the air-tight or substantially air-right chamber 58 of the outer support 30 will determine the magnitude of the air spring that tends to urge the inner support 60 generally away (e.g., upwardly, in a direction represented by arrow 59 in the illustrated embodiments) from the outer support 30. As discussed, in other arrangements, the adjustable seat post assembly 20 can include one or more springs or other biasing members to help urge the inner support 60 generally away from the outer support 30, either in lieu of or in addition to the air spring disclosed herein.

Once a desired volume of air or fluid has been injected into the chamber 58 of the outer support 30 or a desired fluid pressure has been attained therein, the seat post assembly 20 can be secured to the frame 14 and saddle 16 of the bicycle 10 (FIG. 1). In one embodiment, the outer support 30 can be inserted into a hollow member of the bicycle frame 14 which is sized, shaped and otherwise configured to receive the outer support 30. In such arrangements, the outer support 30 or other portion of the seat post assembly 20 can be secured to the frame 14 using a clamping device (not shown), fasteners and/or any other device or method. Alternatively, the outer support 30 can even be a part of the bicycle frame 14 structure itself.

Further, a saddle 16 can be secured to the saddle head 62 of the inner support 60. As illustrated in FIGS. 2 and 4, the saddle head 62 can be configured to receive a standard or non-standard saddle. In some embodiments, the bicycle additionally comprises an exterior cable or other member that operatively connects a lever or other actuation device to the cable 100 situated within the inner support 60. As discussed, such a lever or other actuation device can be conveniently placed on or near the handlebar area of the bicycle. Alternatively, the lever or other actuation device can be placed underneath or near the saddle or along any other portion of the bicycle.

The adjustable seat post assembly 20 advantageously permits a user to change the vertical position of the bicycle saddle, even while the bicycle is being ridden. As discussed with reference to the various embodiments disclosed herein, this can be accomplished by slidably moving the inner support 60 relative to the outer support 30 of the adjustable seat post assembly 20. Additional details of one embodiment of how the supports 30, 60 are permitted to slidably move relative to each other are provided herein in relation to FIGS. 8A-8C.

Figure 8A:
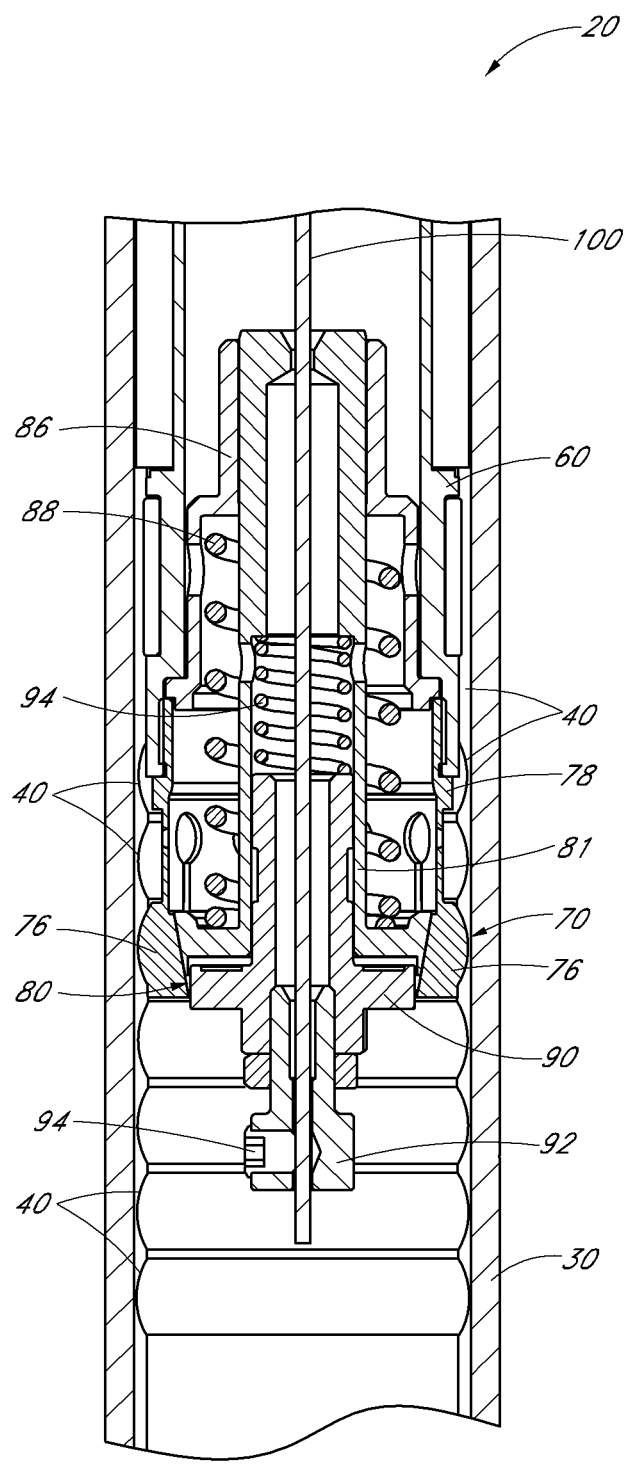
FIGS. 8A-8C illustrate different cross-sectional views of the adjustable saddle post assembly of FIG. 4 with the position of a retention assembly relative to a collet or other expandable portion being selectively modified.

With particular reference to FIG. 8A, an adjustable seat post assembly 20 can comprise an inner support 60 having a collet 70 or other expandable portion that is configured to engage a groove 40 or another portion of the interior wall of the outer support 30 when the collet 70 is in an expanded position. As discussed, the collet 70 or other expandable portion of the inner support 60 can comprise spring metal and/or one or more other resilient materials in order to allow the collet 70 to expand and retract as desired. Further, the collet 70 or other expandable portion can include one or more slots 72, openings 74 and/or other features to further enhance its resilient properties. In one embodiment, the collet 70 is configured to remain in an expanded position when no or substantially no forces are acting on it. Thus, as illustrated in FIG. 8A, the projecting portion 76 of the collet 70 or other expandable portion can normally engage a groove 40 or another surface of the interior wall of the outer support 30.

As discussed in greater detail herein, retraction (e.g., inwardly) of the collet 70 or other expandable portion can be prevented or limited when a retention assembly 80 is positioned within an interior portion of the projecting portion 76 of the collet 70. In some embodiments, the retention assembly 80 comprises a bearing portion 81. In other arrangements, the retention assembly 80 of the seat post assembly 20 can additionally include a locking portion 90 or any other device that can further ensure that the collet 70 or other expandable portion is substantially locked or otherwise remains in an expanded state. Thus, the collet 70 is generally not permitted to retract inwardly and remains engaged to the groove 40 or other interior surface of the outer support 30. Accordingly, the inner support 60 is not permitted no slidably move relative to the outer support 30.

According to some embodiments, in order to vary the vertical position of the bicycle saddle, a rider can manipulate a lever or other actuation device (not shown) that is operatively connected to the cable 100, rod, connector or other movable member of the seat post assembly 20. Movement of the cable 100 in the general direction represented by arrow 102 can cause the locking portion 90 of the retention assembly 80 to move upwardly toward the bearing portion 81. As discussed, the retention assembly 80 need not include both the bearing portion and the locking portion 90. In the cross-sectional view of FIG. 8B, the cable 100 has been moved sufficiently far along direction 102 so that the locking portion 90 contacts the lower surface of the bearing portion 81. The adjacent surfaces of the locking portion 90 and the bearing portion 81 can be sized, shaped and otherwise configured to generally accommodate each other when in mating contact. Thus, as illustrated in FIG. 8B, movement of the cable 100 can help move the locking portion 90 away from the inner surfaces 77 of the collet's projecting portion 76.

Figure 8B:
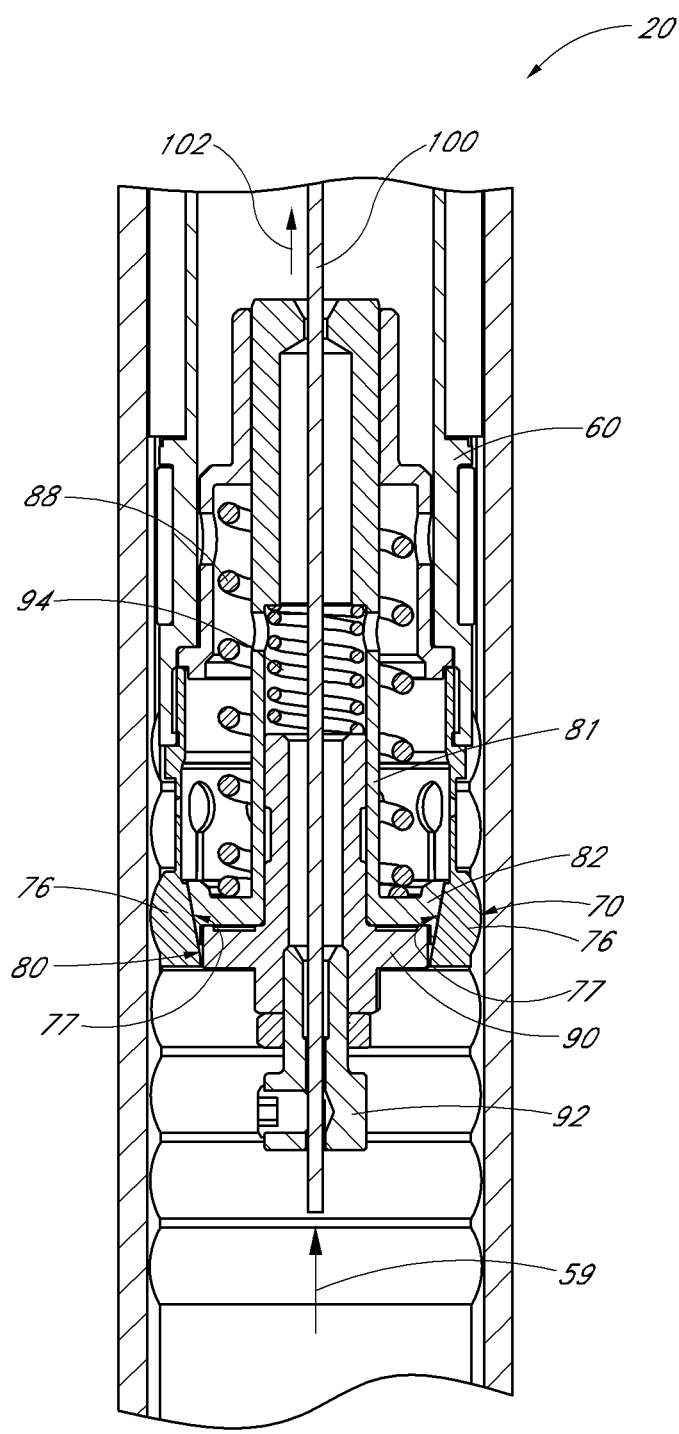
Figure 8C:
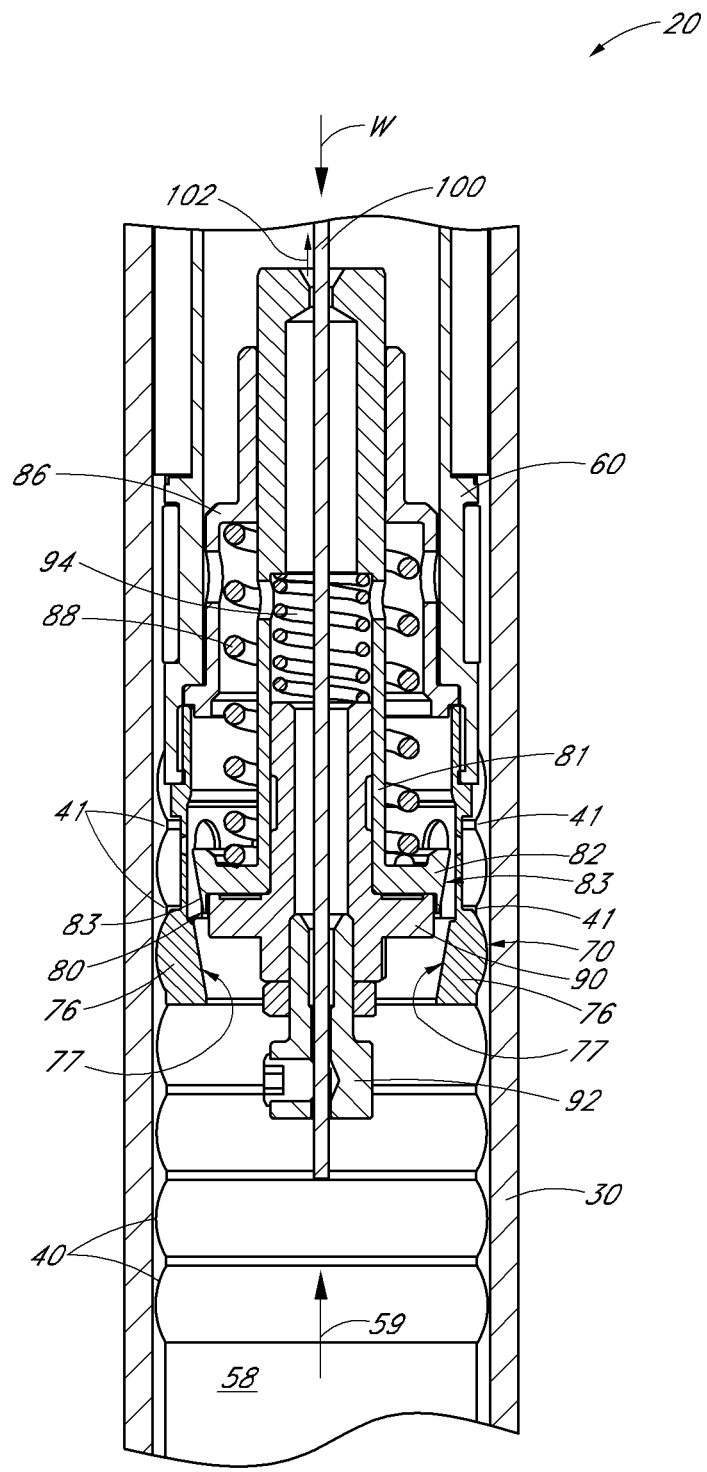

FIG. 8C illustrates the seat post assembly 20 of FIGS. 8A and 8B, with the entire retention assembly 80 (e.g., the locking portion 90, the bearing portion 81, etc.) having been moved upwardly, partially away from the interior of the projecting portion 76 of the collet 70 or other expandable portion. In some embodiments, the retention assembly 80 is moved in such a manner by the continued movement of the cable 100, rod or other movable member (e.g., in a direction generally represented by arrow 102). In the depicted arrangement, the retention assembly 80 has been moved far enough away from the interior of the projecting portion 76 such that the collet 70 or other expandable portion can be allowed to retract inwardly. In some embodiments, the position of the retention assembly 80 relative to the collet 70 can be maintained as long as the lever or other actuation device is being manipulated (e.g., depressed, pulled, etc.). Accordingly, the release of the lever or other actuation device can permit the cable 100 to be resiliently biased toward its original position, such that the locking portion 90, the bearing portion 81 and/or any other portion or component of the retention assembly 80 come to rest within the projecting portion 76 of the collet 70 (as shown in FIG. 8A). As discussed, this can once again prevent the collet 70 or other expandable portion from retracting inwardly, effectively locking the inner support 60 relative to the outer support 30.

With the retention assembly 80 having been moved away from the interior of the projecting portion 76, as illustrated, for example, in FIG. 8C, the collet 70 or other expandable portion can retract to allow the inner support 60 to move relative to the outer support 30.

In one embodiment, the fluid pressure within the chamber 58 of the outer support 30 can be configured to exert a force against the inner support 60 (e.g., in a direction generally represented in FIG. 8C by arrow 59). Accordingly, if the pressure within the chamber 58 is sufficiently high and the collet 70 or other expandable portion is permitted to retract inwardly, the inner support 60 can be moved upwardly relative to the outer support 30. As discussed, a coil spring or any other biasing device or method can be used to generate a force on the inner support 60 relative to the outer support 30, either in lieu of or in addition to the air spring disclosed herein.

Regardless of the exact manner in which a resilient force on the inner support 60 is created, a user can selectively raise the vertical position of the saddle by eliminating or reducing any downwardly directed forces on the saddle (e.g., shifting his or her weight from the saddle to the pedals) and causing the cable 100, rod, connector or other movable member to move in a direction generally represented by arrow 102 in FIG. 8C (e.g., by moving a lever or other actuation device). As discussed, such a movement of the cable 100 can permit the collet 70 or other expandable portion of the inner support 60 to be retracted inwardly. If the force created by the air spring or other resilient member is sufficiently high, the collet 70 or other expandable portion will move (e.g., upwardly in the embodiment illustrated in FIGS. 8A-8C) relative to the outer support 30.

In arrangements where the collet 70 is configured to engage one of a plurality of grooves 40 or other features positioned along the interior surface of the outer support 30, the collet 70 may retract inwardly in order to move past the ridges 41 or other features that separate adjacent grooves 40. As the collet 70 or other expandable portion is moved upwardly, it will engage a different groove or other interior portion of the outer support 30. In will be appreciated that the rate at which the collet 70 or other expandable portion is moved relative to the outer support 30 can be varied depending on the magnitude of the force created by an air spring or other resilient member, the magnitude of any countering force exerted on the inner support 60 (e.g., weight of the inner support 30, saddle and the like, the weight or other downwardly directed force exerted on the saddle by a rider, etc.), the frictional forces between adjacent surfaces of the collet 70 and the grooves 40 or other interior area of the outer support 30, the rate at which the collet 70 or other expandable portion flexes (e.g., retracts and expands) and/or the like.

In some arrangements, the collet 70 or other expandable portion, as well as the inner support 30 and the saddle to which the collet 70 is attached, will continue to be raised to engage increasingly higher grooves or other interior locations of the outer support 30. Once a desired vertical position has been achieved, the user can allow the cable 100 to return to its original position (e.g., by releasing the lever or otherwise manipulating another actuation device). For example, in one embodiment, releasing a lever causes a spring 118 or other biasing member (FIG. 4) to move the pull rod assembly 110 downwardly. Consequently, the cable 100 that is operatively connected to the pull rod assembly 110 will also move downwardly. This can allow the retention assembly 80 (e.g., the bearing portion 81, the locking portion 90, etc.) to once again engage an interior portion of the projecting portion 76 of the collet 70 or other expandable portion of the inner support 60, as illustrated in FIG. 8A. This can prevent the collet 70 from being retracted inwardly, effectively causing it to remain within the particular groove 40 to which it is engaged.

According to some embodiments, in order to lower the vertical position of the saddle, a user can manipulate a lever or another actuator so that the cable 100, rod or other movable member moves in a direction generally represented by arrow 102, as discussed above with reference to FIGS. 8B and 8C. Consequently, the retention assembly 80 can move away from the interior of the projecting portion 76 of the collet 70 or other expandable portion attached to or integrally formed with the inner support 60. Thus, the collet 70 or other expandable portion can be permitted to retract inwardly so it can be selectively moved to a lower groove 40 or other interior portion of the outer support 30.

For example, in some arrangements, once the bearing portion 81, the locking portion 90 and/or any other portion or component of the retention assembly 80 have been moved far enough away from the interior of the projecting portion 76 of the collet 70, the user can shift his or her weight (generally represented by arrow W in FIG. 8C) to the saddle or otherwise apply a downwardly directed force on the inner support 60. As discussed herein with respect to raising the vertical position of the saddle, the collet 70 or other expandable portion can retract inwardly so that the projecting portion is able to move over the ridges 41 or other portions situated between adjacent grooves 40 along the interior wall of the outer support 30. Accordingly, the collet 70 or other expandable portion can engage a lower groove 40 or other portion of the outer support 30, effectively lowering the vertical position of the saddle which is attached to the inner support 60. When a desired vertical location has been achieved, the user may release the lever or other actuation device to effectively prevent further movement of the inner support 60 relative to the inner support 30.

In the examples of changing the vertical position of the saddle provided herein, there are various forces and other factors that can help determine in what direction (and at what rate) the inner support 60 will move relative to the outer support 30. As discussed, some of these may include the upwardly-directed force created by the air spring or other biasing member, the weight W or other downwardly-directed force applied to the saddle (and thus, the inner support 60) by a user, the weight of the inner support 60, saddle and/or other components of the seat post assembly 20, the frictional forces between adjacent surfaces that are intended to move relative to each other (e.g., the outer surface of the collet 70 and the interior surfaces of the outer support 30), the resilient characteristics of the collet 70 or other expandable portion and/or the like. It will be appreciated, that the adjustable seat post assembly can be modified so that one or more other forces or factors can affect the movement of the inner support 60 relative to the outer support 30, either in lieu of or in addition to those discussed herein.

Embodiments of the adjustable seat post assembly 20 that comprise a plurality of grooves 40 or other engaging recesses or features along the interior of the outer support 30 can provide additional advantages. For example, as the collet 70 or other expandable portion of the inner support 30 is moved relative to the outer support 30, the collet 70 can engage one of a number of grooves 40 or other stations. The movement of the collet 70 or other expandable portion between distinct higher or lower grooves 40 or stations can permit a user to more accurately assess the current vertical position of the saddle and to more precisely select a desired vertical setting for the saddle.

In some arrangements, the movement of the collet 70 or other expandable portion relative to the grooves 40 or stations generates a snap fit or other positive engagement. Thus, the movement of the collet 70 between adjacent (e.g., higher or lower) grooves 40 or stations can be felt or otherwise sensed by the user. For example, the seat post assembly 20 can be configured so that such movement between the outer and inner supports 30, 60 creates a tactile response that can be perceived by the user. In other embodiments, the movement of the collet 70 or other expandable portion between distinct grooves 40 or stations can create an audible response (e.g., click or snap sound) that may be perceived by the user, either in lieu of or in addition to any tactile response.

Accordingly, in such embodiments where a collet 70 or other expandable portion of the inner support 60 is configured to move between and engage distinct grooves 40 or stations of the outer support 30, a user may find it easier to choose a desired vertical position for the bicycle saddle. By way of example, a user may determine that a desired vertical change in saddle position between a particular uphill slope and a particular downhill slope requires the collet to be lowered by one, two, three, four or more groove locations. Consequently, the inclusion of tactile and/or audible response features in the seat post assembly 20 can be beneficial to a rider.

Further, as discussed, the expandable portion 70 of the inner support 60 can comprise a different design or configuration than discussed and illustrated herein. In some embodiments, the expandable portion 70 comprises a balloon or other inflatable portion that is configured to be selectively inflated or deflated in order to engage or disengage the interior wall of the outer support 30. In the embodiments disclosed herein, the inner support 60 or other member that comprises a collet 70 or other expandable portion is configured to be attached to the bicycle saddle. Further, the outer support 30 is configured to be attached to the bicycle frame. However, in other embodiments, the configuration of the adjustable seat post assembly can be modified so that the inner support 60 can be attached to the frame and the outer support 30 can be attached to the saddle. In such an arrangement, the seat post assembly can be effectively reversed so that the inner support 60 is generally below the outer support 30. It will be appreciated that the seat post assembly can be modified to include one or more other features or characteristics, either in lieu of or in addition to those illustrated and discussed herein.

As discussed, the seat post assembly 20 can be operatively connected to a lever or other actuation device to permit a user to control the function of the system. In some embodiments, such a lever or other actuation device is located at or near the handlebar area of the bicycle. This can allow a user to conveniently and safely modify the vertical location of the saddle even when the bicycle is being ridden. Alternatively, the lever or other actuation device can be positioned near the seat post assembly (e.g., at or near the bottom of the saddle) or at any other location of the bicycle. Regardless of the exact position of the lever or other actuation device, the seat post assembly can be adjusted before a user begins riding the bicycle or after he or she has begun doing so.

In some arrangements, the adjustable seat post assembly 20 is permanently affixed to a bicycle frame (e.g., the outer support or the inner support is permanently attached to the frame or is incorporated into the frame). Alternatively, the seat post assembly 20 can be configured to be selectively removed and/or replaced to the bicycle frame, as desired or required. In addition, adjustable seat post assemblies, such as those disclosed herein or equivalents thereof can be used on any type of bicycle, including, mountain bikes, road bikes and/or the like.

Figure 9A:
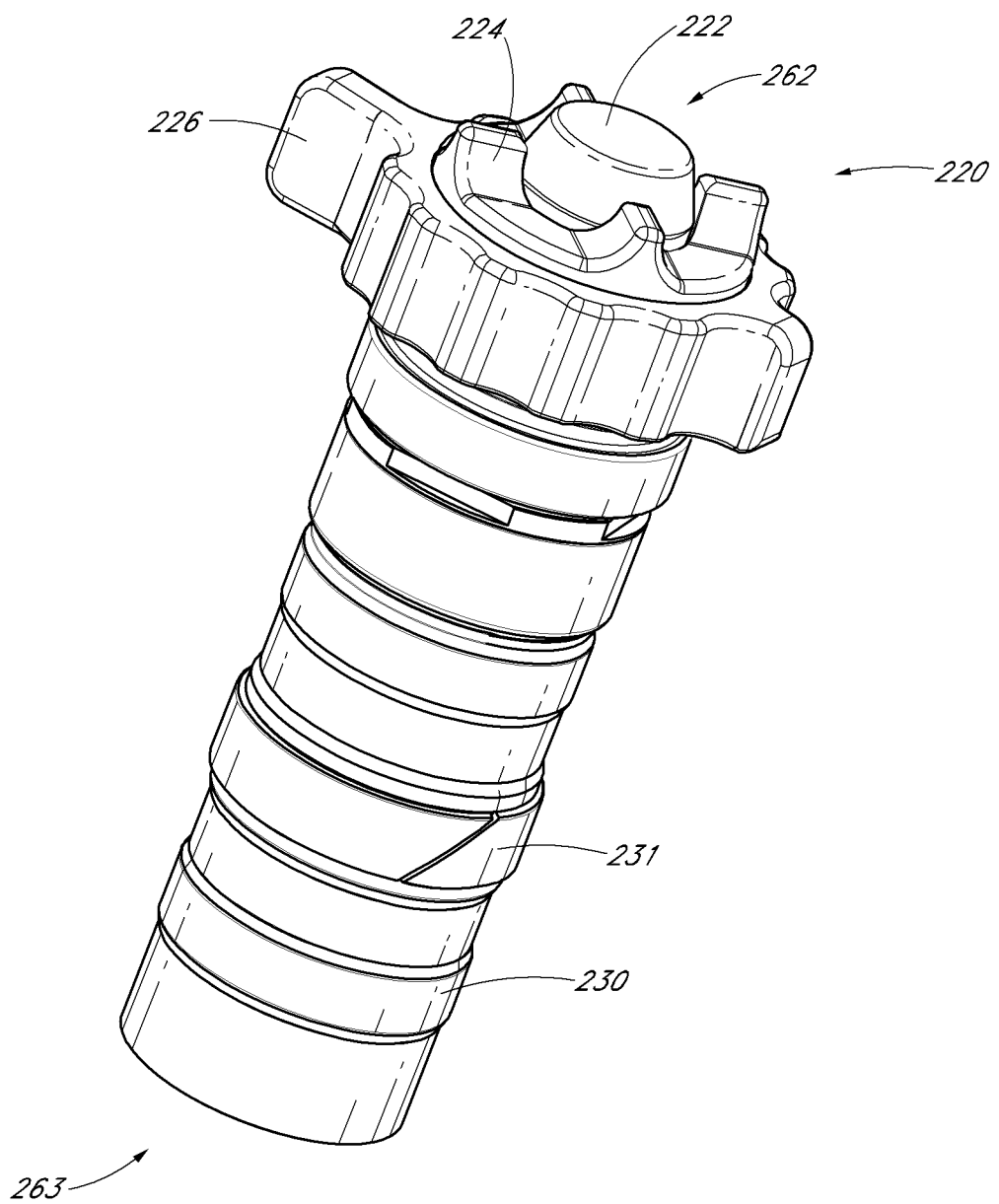
FIG. 9A illustrates a perspective view of an adjustable assembly in a retracted position configured for use in the fork of a bicycle according to one embodiment.
Figure 9B:
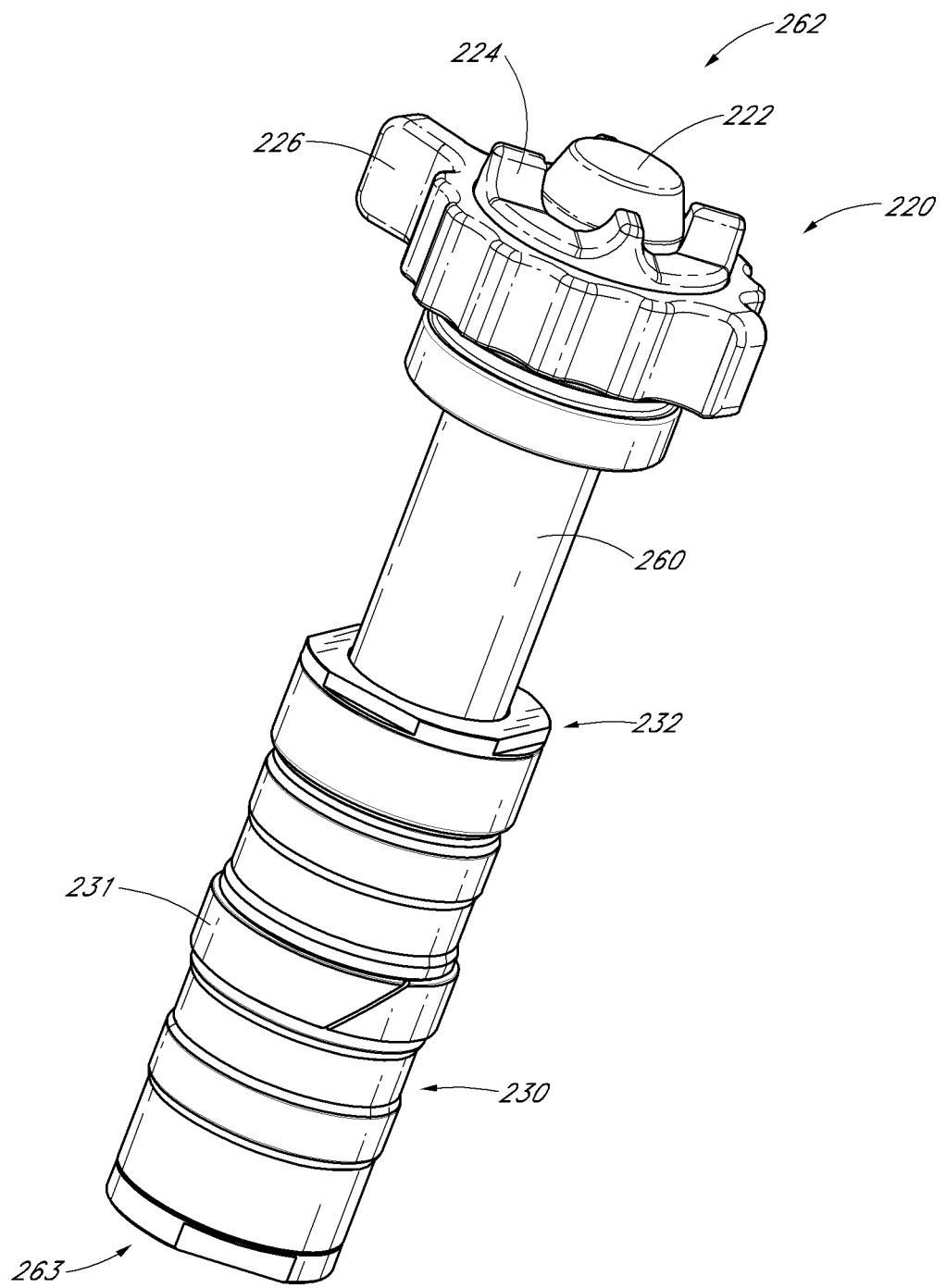
FIG. 9B illustrates the adjustable assembly of FIG. 9A in an expanded position.
Figure 9C:
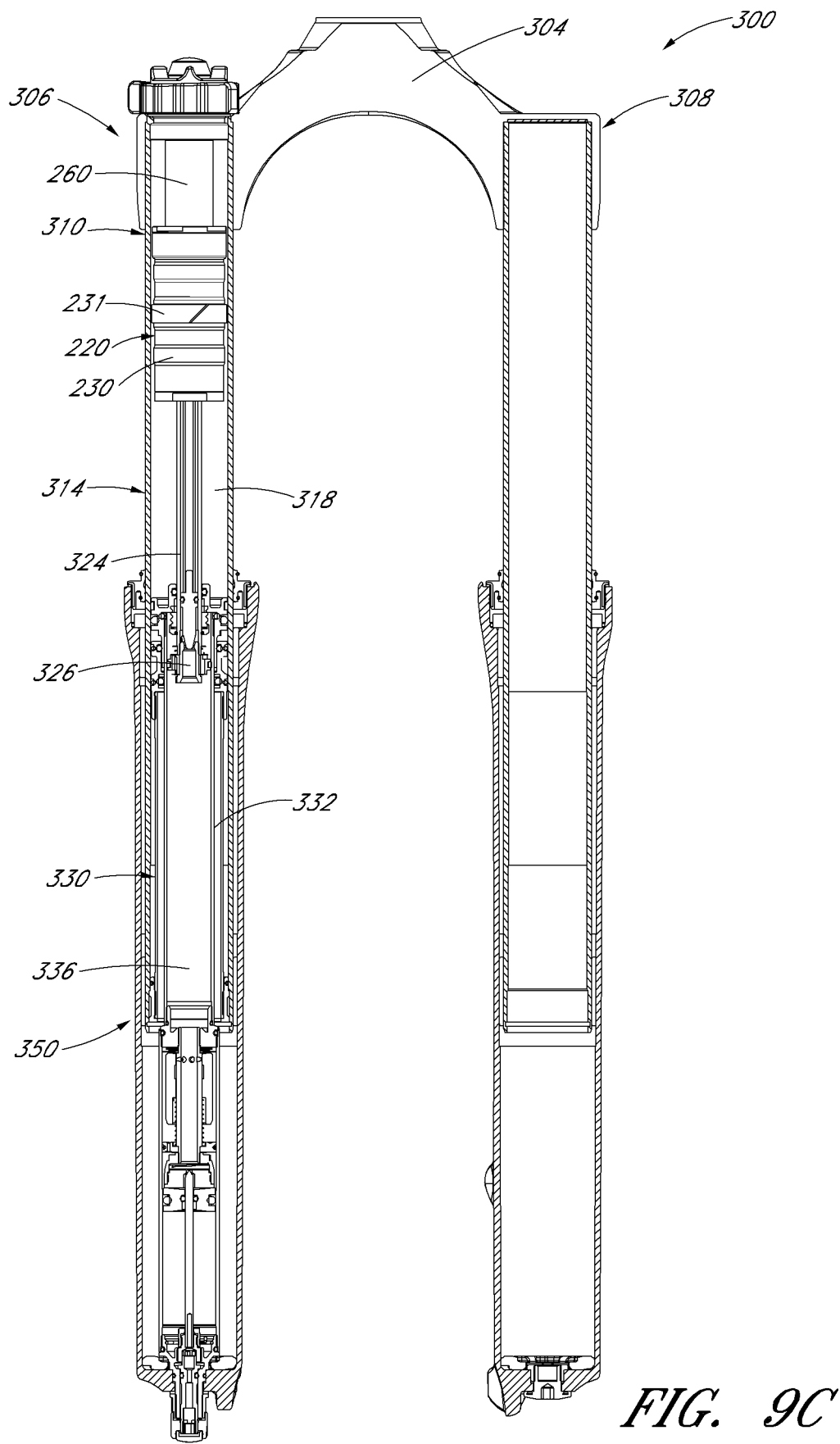
FIG. 9C illustrates the adjustable assembly of FIGS. 9A and 9B positioned within a leg of bicycle fork assembly according to one embodiment.

FIGS. 9A and 9B illustrate an embodiment of a vertically-adjustable assembly 220 configured for use in a fork assembly of a bicycle. One arrangement of a bicycle fork 300 that is configured to receive such an adjustable assembly 220 is illustrated in FIG. 9C. As shown in FIGS. 9A and 9B, the vertically-adjustable assembly 220 can include an upper portion 262 and a lower portion 263.

As shown in FIG. 9C, the adjustable assembly 220 can be positioned within the upper fork leg 310 of a bicycle fork 300. As discussed in greater detail herein, the assembly 220 can advantageously permit the overall length of the fork to be selectively modified as desired by a user. For example, when a rider is climbing an incline, he or she may choose to shorten the length of the fork in order to reduce the likelihood that the front of the bike will raise up into "a wheelie" position or flip over backwards due to pedal forces. Likewise, when a rider is descending down a hill, he or she may choose to increase the length of the fork in order to shift weight away from the front of the bicycle. This can help reduce the likelihood that the bicycle will flip over forwards due to the center of gravity of the rider on descent.

With continued reference to FIG. 9C, the adjustable assembly 220 is positioned along the upper fork leg 310 of the bicycle fork 300. However, in other arrangements, the assembly 220 can be attached of the lower fork leg 350 or any other portion of the bicycle fork assembly. Further, in FIG. 9C, the adjustable assembly 220 is positioned only within one of the fork legs 306. However, in other arrangements, an adjustable assembly 220 can be positioned only within the other fork leg 308 or both fork legs 306, 308.

As discussed, such an adjustable assembly 220 can be modified to be used in one or more other portions of the bicycle to selectively modify the vertical, horizontal or other position of one or more components or portions of the bicycle. For example, an adjustable assembly can be positioned within the head tube of the bicycle to modify the vertical position of the handlebar assembly. In addition, discussed herein, the vertically-adjustable assembly 220 can be differently configured to attach to one or more other portions of a bicycle, such as, for example, a seat post assembly.

FIG. 9B illustrates the assembly 220 of FIG. 9A in an extended position. As discussed in reference to the embodiments illustrated in FIGS. 2-8C above, the assembly 200 can include two supports 230, 260 that are configured to slidably move relative to each other. As a result, such relative movement can modify the vertical position of one or more components or systems to which the vertically-adjustable assembly 220 is mechanically connected. For example, the relative movement of the supports 230, 260 can allow a user to selectively change the effective length of the legs 306, 308 of the fork assembly 300. In some embodiments, the assembly 220 includes a seal head 232 that helps form a relatively tight seal between the two supports 230, 260.

According to some arrangements, as illustrated in FIG. 9C, the vertically-adjustable assembly 220 can be positioned with the upper fork leg 310 of the bicycle fork 300. Thus, as shown, the outer support 230 of the assembly 220 may be sized, shaped and otherwise configured to fit within upper fork leg 310. As discussed in greater detail herein, in some embodiments, the adjustable assembly 220 is configured to freely slide within the upper fork leg 310 or any other support or member into which it is positioned. Accordingly, one or more slide rings 231 or other members configured to facilitate such movements can be positioned along the outside of the adjustable assembly 220.

Vertically-adjustable assemblies 220 such as those discussed and/or illustrated herein, can be included as an original component (e.g., fork assembly, seat post assembly, etc.) of a bicycle. Alternatively, they could be after-market items that replace one or more original bicycle components.

The structural differences between the adjustable assembly of FIGS. 9A and 9B and the embodiment of FIGS. 2-8C are discussed below. With reference to the cross-sectional view of FIG. 10, the interior wall of the outer support 230 includes a plurality of grooves 240. As discussed in greater detail herein with reference to other embodiments, these grooves 240 can be sized, shaped and otherwise configured to engage an outer surface of a collet 270 or other expansion portion of the inner support 230. Accordingly, the relative position of the inner and outer supports 260, 230 can be selectively fixed at certain distinct locations. In the embodiment illustrated in FIG. 10, the outer support 230 includes a total of three grooves 240 along its interior wall. In one embodiment, the distance separating the upper most and lower most grooves is approximately 33 mm (~1.3 inches).

However, it will be appreciated, that an outer support 230 can include more or fewer grooves 240 and/or the distance separating the grooves can be greater or smaller than approximately 33 mm, as desired or required for a particular application or use.

Figure 10:
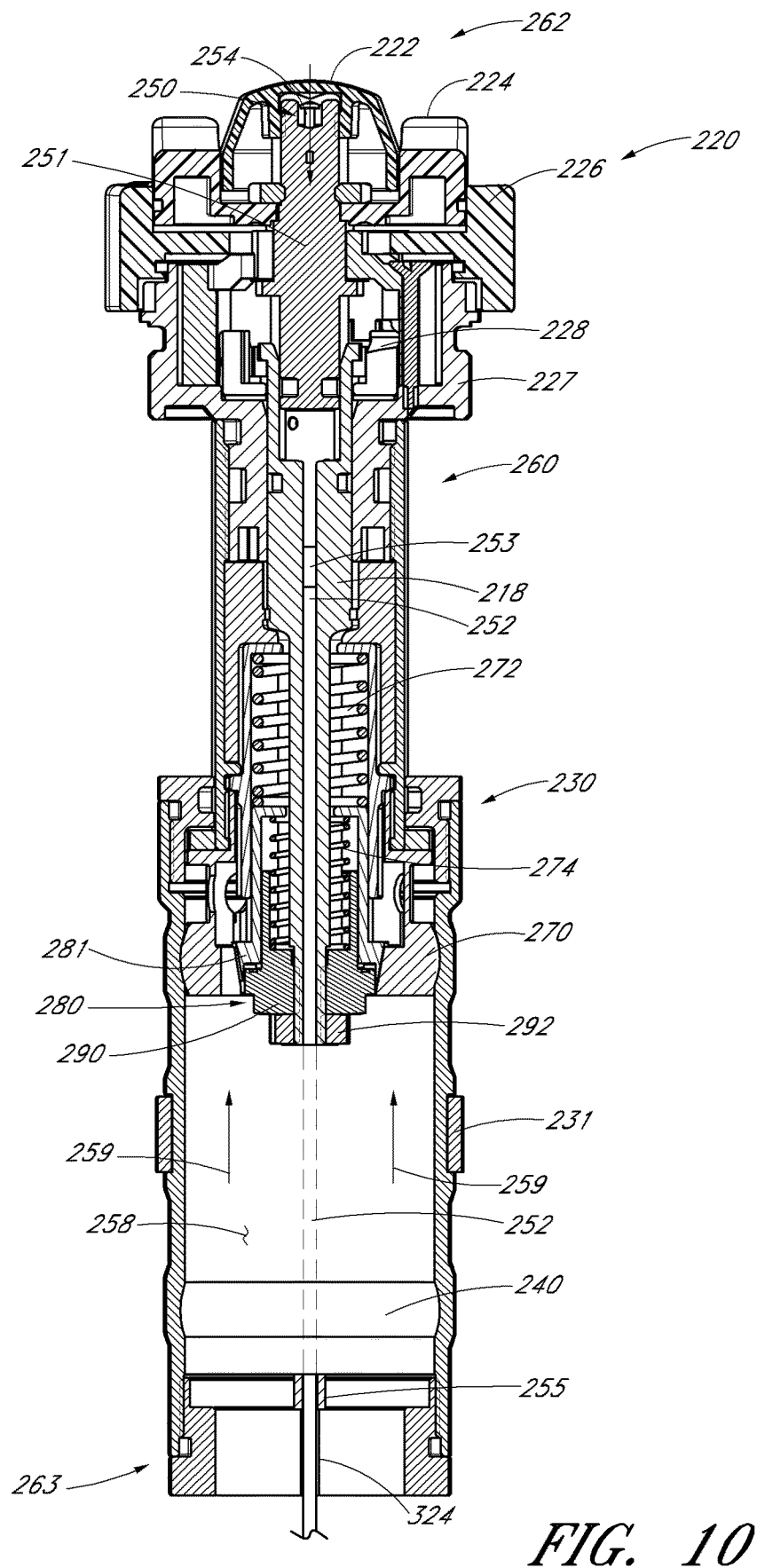
FIG. 10 illustrates a cross-sectional view of the adjustable assembly of FIGS. 9A and 9B.

With continued reference to FIG. 10, an interior space of the outer support 230 can comprise a chamber 258 or other cavity, which may be selectively pressurized to create an upwardly force (e.g., generally represented by arrows 259 in FIG. 10). As discussed, such an upwardly force can help urge the inner support 260 upwardly, generally away from the lower portion 263 of the assembly 220. This effectively extends the vertical length of the assembly 220, thereby allowing the vertical position of one or more components (e.g., piston rod 324, etc.) to be modified.

In the embodiment depicted in FIG. 10, air or other fluid can be injected into the chamber 258 of the outer support 230 through an air plug assembly 250 located near the upper portion 262 of the assembly 220. As shown, the air plug assembly 250 can comprise a Schrader valve 254 or another type of valve that permits air or other fluids to be delivered to the chamber 258 through an upper tube assembly 251 and a lower tube assembly 218. It will be appreciated that other methods or devices can be used to help provide a pressurized chamber 258 within the outer support 230. In other arrangements, one or more springs or other biasing members can be used to help urge the inner support 260 away from the outer support 230, either in lieu of or in addition to the air spring created within the chamber 258. The air plug assembly 250 can be protected by a cap 222 or other cover. Thus, a user may have to remove such a cap 222 in order to transfer air or other fluid into or out of the chamber 258.

The illustrated embodiment includes a similar interaction between a retention assembly 280 and collet 270 as discussed in greater detail herein with reference to the seat post assembly. Thus, in some embodiments, under normal conditions, the bearing portion 281 and the locking portion 290 of the retention member 280 are biased or otherwise secured within a lower portion of the collet 270 or other expansion portion. Consequently, the collet 270 is securely positioned within a groove 240 of the outer support 230. This prevents relative movement between the outer and inner supports 230, 260 and the components to which they are attached.

Figure 11A:
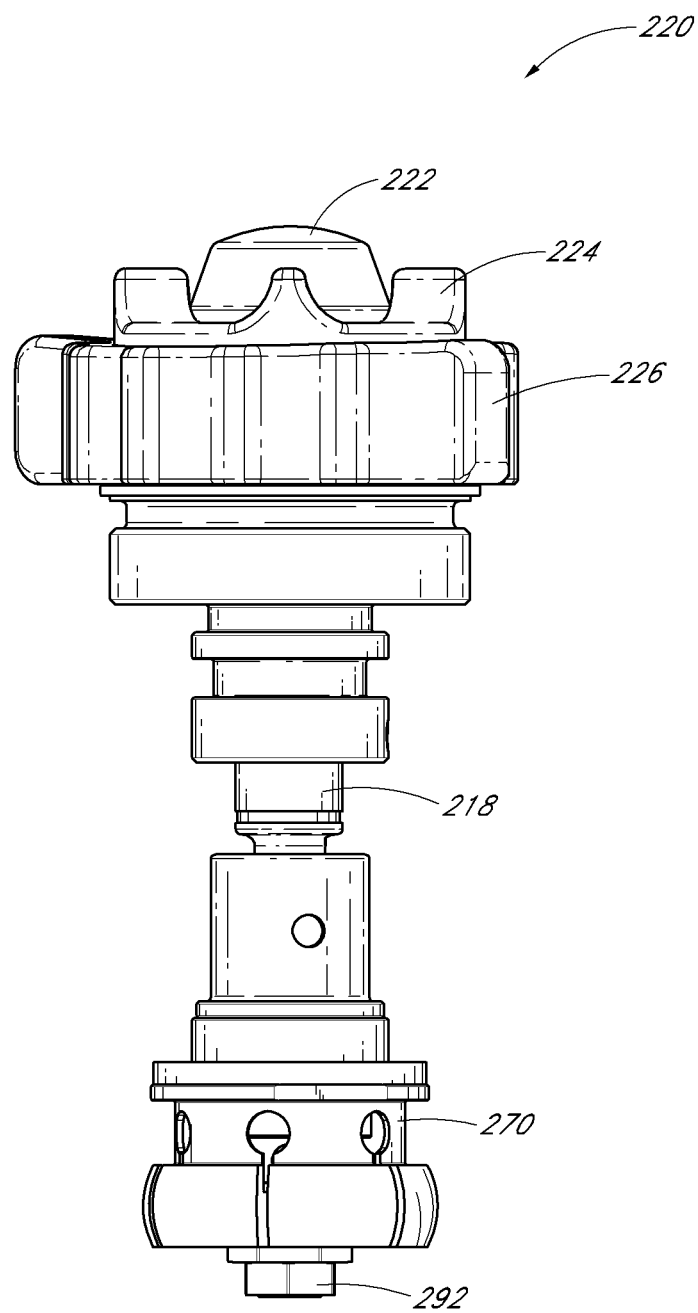
FIG. 11A illustrates a side view of the adjustable assembly of FIGS. 9A and 9B with certain components hidden for clarity.
Figure 11B:
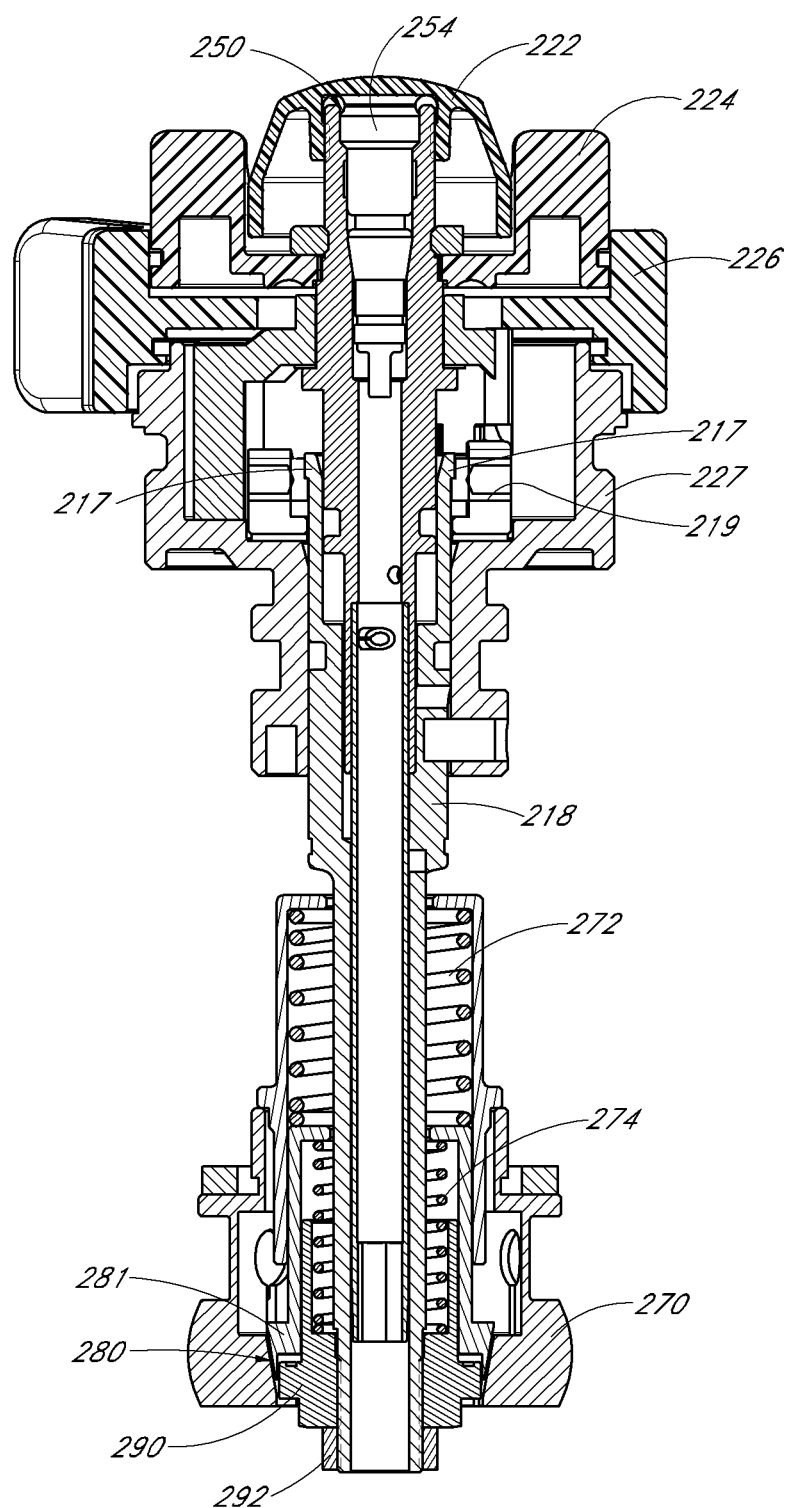
FIG. 11B illustrates a cross-sectional view of the adjustable assembly of FIGS. 9A and 9B with certain components hidden for clarity.

In order to allow the collet 270 to be retracted inwardly (e.g., upwardly or downwardly away from the particular groove 240 in which it is positioned), the retention member 280 (e.g., the bearing portion 281, locking portion 290, etc.) need to be moved upwardly, out of the interior of the collet 270, as generally discussed with reference to FIGS. 8A-8C above. As illustrated in FIGS. 10 and 11B, springs 272, 274 or other biasing members can be used to normally urge the bearing portion 281 and the locking portion 290 of the retention member 280 within the interior of the collet 270.

Unlike the assembly illustrated in FIGS. 2-8C, the vertically-adjustable assembly depicted in FIG. 10 does not include a cable. Instead, the retention member 280 is mechanically connected to the lower tube assembly 218. Thus, by being rigid and hollow, such a lower tube assembly 218 can be configured to both move the retention member 280 and provide air or other fluid to the chamber 258 of the outer support 230. In a similar manner as discussed herein with respect to the seat post assembly, the lower tube assembly 218 can be selectively raised against the biasing force of the springs 272, 274 to move the retention member out of the interior of the collet 270. As a result, the collet 270 can be permitted to move to a different (e.g., higher or lower) groove 240 along the interior of the outer support 230.

With reference back to FIG. 9C, the outer support 230 can be attached to a piston rod 324. As shown, the piston rod 324 can include a piston 326 that is configured to move within the interior of a damper tube 332 of a damper 330. Such a configuration can be used to provide a desired level of cushioning or damping to the front wheel of bicycle. Further, in order for the suspension system to function properly, the fork leg 306 can include a suspension spring 314 having an air spring chamber that is adapted to urge the upper fork leg 310 and the lower fork leg 350 away from each other. In some embodiments, the damper 330 and its various components are included in a self-contained cartridge that can be conveniently positioned within the fork assembly. Additional information regarding the piston rod 324, the piston 326, the damper, the suspension spring and other components and features of the suspension fork is disclosed in U.S. patent application Ser. No. 12/134,116, filed Jun. 5, 2008, titled BICYCLE SUSPENSION ASSEMBLY and published as U.S. Publication No. 2009/0001684, the entirety of which is hereby incorporated by reference herein.

In some embodiments, as shown in FIG. 9C, the piston rod 324 is connected to the outer support 230 of the adjustable assembly 220. Thus, relative movement between the inner support 260 and the outer support 230 of the adjustable assembly 220 varies the effective length of the piston rod 324. When the outer and inner supports 230, 260 are in an extended position relative to each other, the effective length of the piston rod 324 is increased. As a result, the upper fork leg 310 moves upwardly relative to the lower fork leg 350 of the bicycle fork 300. Accordingly, the overall length (e.g., height) of the fork 300 is increased, thereby causing the front end of the bicycle to be raised. Similarly, when the outer and inner support 230, 260 of the adjustable assembly 220 move closer together, the effective length of the piston rod 324 can be decreased. This causes the upper fork leg 310 to move downwardly relative to the lower fork leg 350. Consequently, the front end of the bicycle can be selectively lowered.

According to some embodiments, the piston rod 324 is threaded or otherwise attached to the bottom of the outer support 230 of the adjustable assembly 220. However, in other arrangements the connection between the piston rod 324 and the adjustable assembly 220 can be different (e.g., more complex), as desired or required. In some embodiments, it may be desirable to control one or more valves or other devices positioned at or near the piston 326 and/or another component or device situated generally below the adjustable assembly 220. For example, the dampening effect of the damper 330 can be regulated by manipulating a valve positioned at or near the piston 326. As illustrated in FIG. 10, the piston rod 324 can be rotatably coupled to a rod 252 that runs along the centerline of the adjustable assembly 220. As shown, the rod 252 is mechanically connected to the upper tube assembly 251 using one or more couplings 253 or other joining devices. In order to vary the effective length of the piston rod 324 so that the overall length of the fork assembly 300 can be modified, the rod 252 can be configured to accommodate the slack that occurs when the outer and inner supports 230, 260 move relative to each other. For example, in one embodiment, the rod is configured to move within a portion of the upper tube assembly 251, or vice versa.

In some embodiments, the upper tube assembly 251 and the rod each include corresponding hexagonal, D-shaped or other cross sectional shapes to ensure that they are rotatably coupled to each other. In addition, as illustrated in FIG. 10, the bottom of the outer support 230 of the adjustable assembly 220 can include a seal 255 through which the rod 252 passes to engage the piston rod 324. Such a seal 255 ensures that the air spring within the chamber 258 of the outer support 230 is adequately maintained. With continued reference to FIG. 10, the upper tube assembly 251, and thus the rod 252, are rotatably coupled to a damper control knob 224 positioned near the top of the adjustable assembly 220. Thus, a user can actuate the knob to manipulate a damper valve or other device positioned below the adjustable assembly 220.

In embodiments where control of a damper valve or other device is not desired or necessary, the adjustable assembly 220 need not include a rod 252, bottom seal 255 and/or other components described herein and illustrated in FIG. 10. In such arrangements, the piston rod 324 can be threadably or otherwise attached to the bottom of the outer support 230 of the adjustable assembly 220.

In some embodiments, as illustrated in FIGS. 9A-12, the vertically-adjustable assembly 220 can include one or more rotatable knobs 226 that are used to selectively move the retention member 280 into and out of the collet 270 or other expansion portion. For example, as illustrated in the cross-sectional view of FIG. 11B, knob 226 can be directly or indirectly attached (e.g., using bolts, other fasteners, etc.) to a connector 227 that is configured to rotate along with the knob 226.

Figure 12:
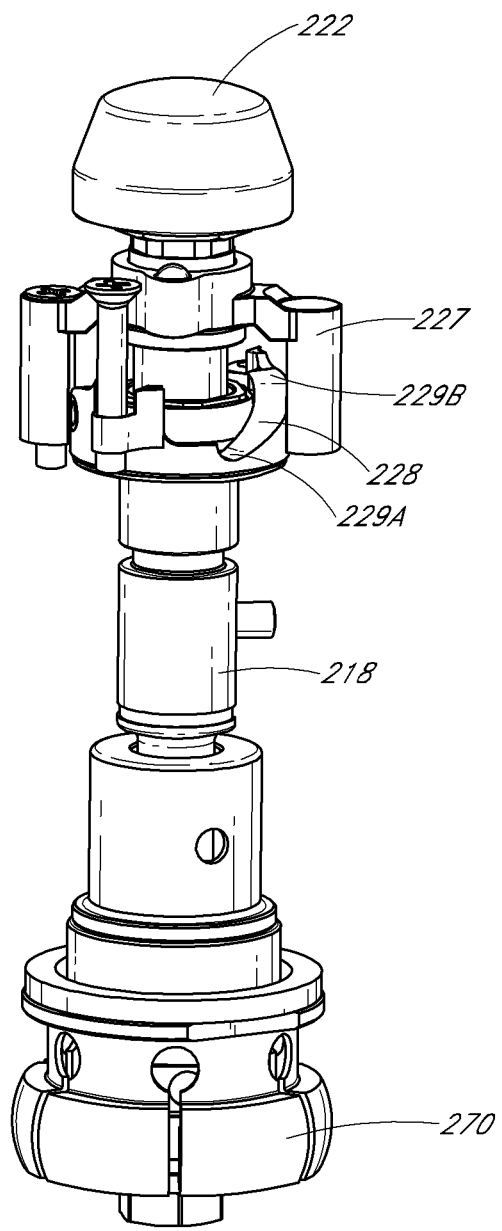
FIG. 12 illustrates a perspective view of the adjustable assembly of FIGS. 9A and 9B with certain components hidden for clarity.

With continued reference to FIG. 12, the connector 227 can include one or more cammed surfaces 228 that are also configured to rotate when the knob 226 is manipulated. As best seen in the cross-sectional view of FIG. 11B, an upper end of the lower tube assembly 218 can include an outer flange 217 or other protruding feature that is sized, shaped and otherwise adapted to engage the cammed surfaces 228 of the connector 227. Therefore, since the lower tube assembly 218 is operatively connected to the retention member 280, rotation of the knob 226 about a central axis of the assembly 220 can cause the flange 217 to move along the slanted cammed surfaces 228 of the connector 227. Consequently, the vertical position of the retention member 280 can be advantageously modified.

With continued reference to FIG. 12, the cammed surfaces 228 of the connector 227 can include lower and upper notches 229A, 229B, flat portions or other features that are designed to at least temporarily prevent relative movement between the connector 227 and the lower tube assembly 218. In some embodiments, such a temporary lock can be released by manipulating a second knob 224 or other actuation device of the assembly.

In use, whenever a user wishes to raise the front end of the bicycle, he or she can turn the knob 226 in order to move the retention member 280 upwardly, generally away from the interior of the collet 270. As a result, a user can allow an upwardly force (e.g., the air spring created within the chamber 258 of the outer support) to help move the collet 270 grooves 240. When a desired vertical position is achieved, the user can turn the knob 226 in the opposite direction, operate a different knob or actuation device and/or perform another necessary task to ensure that the retention member 280 once again is securely lowered within an interior of the collet 270. Alternatively, if a user wishes to lower the front end of the bicycle, he or she can exert a downward force (e.g., in a direction generally opposite of the air spring force) to move the collet 270 to a lower groove 240.

As discussed, by modifying the relative position of the outer and inner supports 230, 260 of the adjustable assembly 220, the rider can effectively change the length of the piston rod 324 to which the outer support 230 is attached. Consequently, the relative position of the upper fork leg 310 can be modified relative to the lower fork leg 350. This allows the user to selectively alter the overall length of the fork assembly 300, and permits him or her to either raise or lower the front end of the bicycle. As discussed, this can be particularly advantageous when riding the bicycle up or down an incline.

In some embodiments, the user manipulates a knob 226 as illustrated in FIG. 10 to modify the position of the adjustable assembly 220. However, in other arrangements, the position of the adjustable assembly 220 can be controlled using a lever, knob or other actuation device positioned at or near the handlebars of the bicycle. This can permit a user to easily and safely modify the position of the fork assembly 300 while riding the bicycle without having to take him or her hands off the handlebars.

Although the foregoing description of the preferred embodiments has shown, described, and pointed out certain novel features, it will be understood that various omissions, substitutions and/or changes in the form of the detail of the apparatus, device, system and/or method as illustrated, as well as the uses thereof, may be made by those skilled in the art without departing from the spirit of this disclosure. Consequently, the scope of the present inventions should not be limited by the foregoing discussion, which is intended to illustrate rather than limit the scope of the inventions.

In addition, although this invention has been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of this inventions, will be readily apparent to those of skill in the art based upon this disclosure. It is also contemplated that various combinations or subcombinations of the specific features and aspects of the embodiments may be made and still fall within the scope of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described and illustrated herein, but should be determined only by a fair reading of the claims that follow.

What is claimed is:

1. An adjustable assembly for a bicycle, comprising:
   a first tubular support having an interior surface;
   a second tubular support slidably positioned longitudinally within the first tubular support, said second tubular support being adjacent to at least a portion of the interior surface of the first support;
   wherein one of the first support and the second support is adapted to attach to a first bicycle portion, and wherein another of the first support and the second support is adapted to attach to a second bicycle portion;
   wherein the second support comprises an expansion portion, wherein the expansion portion is selectively movable between a radially expanded position and a radially retracted position, wherein an outer surface of the expansion portion engages at least a portion of the interior surface of the first support when the expansion portion is in the radially expanded position;
   wherein the expansion portion is resiliently biased toward the radially expanded position;
   a retention assembly coupled to the second support, said retention assembly being movable relative to a longitudinal axis of the expansion portion and the second support between a first position and a second position;
   wherein, when in the first position, the retention assembly is at least partially within an interior space of the expansion portion, preventing the expansion portion from moving to the radially retracted position;
   wherein, when in the second position, the expansion portion is permitted to selectively move to the radially retracted position to permit relative movement between the first support and the second support; and
   a connector operatively coupled to the retention assembly, whereby movement of the connector by a user moves the retention assembly between the first position and the second position.

2. The adjustable assembly of claim 1, wherein the first bicycle portion comprises a bicycle frame and the second bicycle portion comprises a bicycle saddle.

3. The adjustable assembly of claim 2, further comprising the bicycle frame.

4. The adjustable assembly of claim 1, wherein the first bicycle portion comprises a fork assembly and the second bicycle portion comprises a handlebar assembly.

5. The adjustable assembly of claim 1, wherein the interior surface of the first support comprises a plurality of grooves, and the expansion portion comprises one or more radially projecting portions configured to engage one of said plurality of grooves when the expansion portion is in the radially expanded position.

6. The adjustable assembly of claim 5, wherein the plurality of grooves and the one or more radially projecting portions are shaped such that, when the retention assembly is in the second position, the expansion portion will be forced to the retracted position in response to a sufficiently large force applied to the first support or the second support along the longitudinal direction.

7. The adjustable assembly of claim 6, wherein the plurality of grooves comprise a concave shape, and the one or more radially projecting portions comprise a convex shape.

8. The adjustable assembly of claim 6, wherein the one or more radially projecting portions comprise a shape that substantially matches a shape of the plurality of grooves.

9. The adjustable assembly of claim 6, further comprising an air spring configured to bias the first support and the second support away from one another along the longitudinal direction.

10. The adjustable assembly of claim 9, wherein the air spring is configured to provide a sufficiently large force to cause the expansion portion to be forced to the retracted position when the retention assembly is in the second position.

11. The adjustable assembly of claim 1, wherein resiliently biasing the expansion portion toward the radially expanded position causes the expansion portion to resist relative movement between the first and second supports when the retention assembly is in the second position.

12. The adjustable assembly of claim 1, wherein resiliently biasing the expansion portion toward the radially expanded position causes the expansion portion to remain engaged with at least a portion of the interior surface of the first support when the retention assembly is in the second position.

13. The adjustable assembly of claim 1, wherein the expansion portion comprises a collet.

14. The adjustable assembly of claim 13, wherein the collet comprises a resilient material, and the expansion portion is resiliently biased by elastic bending of the resilient material.

15. The adjustable assembly of claim 14, wherein the resilient material comprises spring steel.

16. The adjustable assembly of claim 13, wherein the collet comprises a plurality of projecting portions extending circumferentially around an outer portion of the collet, wherein a radially outer surface of the plurality of projecting portions defines a diameter that, in a relaxed state of the collet, is larger than an inner diameter of the interior surface of the first support.

17. The adjustable assembly of claim 1, wherein the expansion portion comprises at least one projecting portion configured to move between the radially retracted position and the radially expanded position to selectively engage the interior surface of the first support.

18. The adjustable assembly of claim 17, wherein the at least one projecting portion comprises a plurality of projecting portions separated by slots.

19. The adjustable assembly of claim 1, wherein the connector is operatively connected to a lever configured to be manipulated while the bicycle is being ridden.

20. The adjustable assembly of claim 1, wherein the connector comprises a cable or a rod.

\* \* \* \* \*